(12) United States Patent
Jiang et al.

(10) Patent No.: US 12,088,536 B2
(45) Date of Patent: Sep. 10, 2024

(54) METHOD FOR INDICATING DIRECT CURRENT SUBCARRIER AND COMMUNICATION APPARATUS

(71) Applicant: HUAWEI TECHNOLOGIES CO., LTD., Guangdong (CN)

(72) Inventors: Zhenjun Jiang, Hangzhou (CN); Yunfei Qiao, Hangzhou (CN); Jianwei Zhou, Hangzhou (CN); Chenlei Xu, Hangzhou (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 18/150,930

(22) Filed: Jan. 6, 2023

(65) Prior Publication Data

US 2023/0163935 A1 May 25, 2023

Related U.S. Application Data

(63) Continuation of application No. PCT/CN2021/098518, filed on Jun. 7, 2021.

(30) Foreign Application Priority Data

Jul. 7, 2020 (CN) .......................... 202010647084.3

(51) Int. Cl.
*H04L 5/00* (2006.01)
*H04L 5/02* (2006.01)

(52) U.S. Cl.
CPC ............ *H04L 5/0098* (2013.01); *H04L 5/023* (2013.01)

(58) Field of Classification Search
CPC ...... H04L 5/0096; H04L 5/0098; H04L 5/023
See application file for complete search history.

(56) References Cited

U.S. PATENT DOCUMENTS

2019/0313394 A1* 10/2019 Kubota ................. H04W 72/20

* cited by examiner

*Primary Examiner* — Rahel Guarino
(74) *Attorney, Agent, or Firm* — Fish & Richardson P.C.

(57) ABSTRACT

The present disclosure relates to methods for indicating a direct current subcarrier and communication apparatuses. In one example method, a second communication apparatus may explicitly or implicitly indicate a location of a first direct current subcarrier and a location of a second direct current subcarrier to a first communication apparatus. The first direct current subcarrier is a direct current subcarrier corresponding to a transmit frequency used by the second communication apparatus. The second direct current subcarrier is a direct current subcarrier corresponding to a receive frequency used by the first communication apparatus.

16 Claims, 8 Drawing Sheets

(a) Analog end frequency offset pre-compensation (b) Analog end frequency offset post-compensation

METHOD FOR INDICATING DIRECT CURRENT SUBCARRIER AND COMMUNICATION APPARATUS

CROSS-REFERENCE TO RELATED APPLICATIONS

This application is a continuation of International Application No. PCT/CN2021/098518, filed on Jun. 7, 2021, which claims priority to Chinese Patent Application No. 202010647084.3, filed on Jul. 7, 2020. The disclosures of the aforementioned applications are hereby incorporated by reference in their entireties.

TECHNICAL FIELD

This application relates to the communication field, and more specifically, to a method for indicating a direct current subcarrier and a communication apparatus.

BACKGROUND

Satellite communication is less affected by geographical conditions and can achieve the goal of global coverage. Therefore, the development of satellite communication is of great significance. Especially, when local infrastructure communication facilities are severely damaged and normal communication cannot be performed due to natural disasters, satellite communication can provide powerful communication guarantee for effective disaster relief. In addition, in some areas that are not conducive to erection of ground base stations, including oceans, deserts, mountains, and the like, effective communication can be performed by using satellite communication, to ensure full coverage of communication.

Because a relative speed between a satellite and a terminal device is high, a large Doppler frequency offset is generated between the satellite and the terminal device. Therefore, Doppler frequency offset compensation needs to be performed on a satellite side or on a terminal side. Otherwise, decoding performance is affected, and even the system cannot work.

However, after Doppler frequency offset compensation, a phenomenon may occur that a subcarrier, at a transmit end, affected by direct current leakage and a subcarrier, at a receive end, affected by direct current leakage do not overlap (not within one subcarrier spacing). In other words, a bandwidth part (BWP) of the receive end is affected by the direct current leakage at the two locations, affecting signal processing by the receive end.

SUMMARY

This application provides a method for indicating a direct current subcarrier and a communication apparatus, so that a receive end can learn both a location of a direct current subcarrier corresponding to a transmit end and a location of a direct current subcarrier corresponding to the receive end, to help the receive end process a signal.

According to a first aspect, this application provides a method for indicating a direct current subcarrier. The method includes: A first communication apparatus obtains first information and second information, where the first information indicates a location of a first direct current subcarrier on a frequency domain resource, the first direct current subcarrier is a direct current subcarrier corresponding to a transmit frequency used by a second communication apparatus, the frequency domain resource includes frequency domain resources inside and outside a frequency band, the frequency band is a carrier frequency band corresponding to a subcarrier spacing used by the first communication apparatus, and the second information indicates a Doppler frequency offset value between the first communication apparatus and the second communication apparatus; and the first communication apparatus determines the location of the first direct current subcarrier on the frequency domain resource and a location of a second direct current subcarrier on the frequency domain resource based on the first information and the second information, where the second direct current subcarrier is a direct current subcarrier corresponding to a receive frequency used by the first communication apparatus.

In the foregoing technical solution, the first communication apparatus may obtain the information that indicates the location of the first direct current subcarrier on the frequency domain resource and the information that indicates the Doppler frequency offset value between the first communication apparatus and the second communication apparatus, so as to determine the location of the first direct current subcarrier based on the information that indicates the location of the first direct current subcarrier on the frequency domain resource, and further determine the location of the second direct current subcarrier based on the location of the first direct current subcarrier and the Doppler frequency offset value between the first communication apparatus and the second communication apparatus. In this way, the first communication apparatus can explicitly or implicitly learn whether the direct current subcarriers on receive and transmit sides are within the carrier frequency band corresponding to the first communication apparatus, to properly perform processing, thereby helping the first communication apparatus process a signal.

With reference to the first aspect, in some possible implementations, the first information includes a first index value, and a quantity of subcarriers between the first direct current subcarrier and a start subcarrier of the frequency band is an absolute value of the first index value, where a value range of the first index value is [−X, Y], X is greater than Z and less than or equal to 4096, Y is greater than 3300+Z and less than or equal to 4095, and Z is greater than or equal to 0.

In a conventional technology, a value range of an index value of a direct current subcarrier location indication field is [0, 3300]. 0 to 3299 each indicate a specific location of a direct current subcarrier in a carrier frequency band corresponding to a subcarrier spacing used by a receive end, and 3300 indicates that the direct current subcarrier is outside the carrier frequency band corresponding to the subcarrier spacing used by the receive end. Therefore, the index value in the conventional technology indicates a specific location of a direct current subcarrier in the carrier frequency band corresponding to the subcarrier spacing used by the receive end, but cannot indicate a specific location of the direct current subcarrier outside the carrier frequency band corresponding to the subcarrier spacing used by the receive end.

In the foregoing technical solution, the value range of the index value of the direct current subcarrier location indication field is extended, and a 12-bit unsigned number is extended to a 13-bit signed number, so that the direct current subcarrier location indication field can indicate a specific location of a direct current subcarrier in the carrier frequency band corresponding to the subcarrier spacing used by the first communication apparatus, and can also indicate a specific location of the direct current subcarrier outside the carrier frequency band corresponding to the subcarrier spacing used by the first communication apparatus. In other words, the location of the direct current subcarrier in this embodiment of this application is a location within a larger range, so that the location of the second direct current subcarrier is determined based on the location of the first direct current subcarrier.

With reference to the first aspect, in some possible implementations, the first information includes a second index value and indication information, and a quantity of subcarriers between the first direct current subcarrier and a start subcarrier of the frequency band is the second index value, where the indication information indicates an offset direction of the first direct current subcarrier relative to the start subcarrier, a value range of the second index value is [0, Y], Y is greater than 3300+Z and less than or equal to 4095, and Z is greater than or equal to 0.

In the foregoing technical solution, the value range of the index value of the direct current subcarrier location indication field is extended, and a 12-bit unsigned number still indicates the location of the first direct current subcarrier, but one piece of indication information is added to indicate the offset direction of the first direct current subcarrier relative to the start subcarrier. By using this technical solution, the location of the direct current subcarrier within a larger range can also be indicated, so as to determine the location of the second direct current subcarrier based on the location of the first direct current subcarrier.

With reference to the first aspect, in some possible implementations, the indication information is indicated by using a first Boolean variable.

In the foregoing technical solution, one bit may be added to indicate the offset direction of the first direct current subcarrier relative to the start subcarrier, and bit overheads are low.

With reference to the first aspect, in some possible implementations, Z is obtained by rounding up a normalized maximum Doppler frequency offset value between the first communication apparatus and the second communication apparatus.

In this way, the value ranges of the first index value and the second index value can cover all possible locations of the first direct current subcarrier, to help the second communication apparatus accurately indicate the location of the first direct current subcarrier.

With reference to the first aspect, in some possible implementations, that a first communication apparatus obtains first information and second information includes: The first communication apparatus obtains the first information and the second information from the second communication apparatus.

According to a second aspect, this application provides a method for indicating a direct current subcarrier. The method includes: A second communication apparatus determines first information, where the first information indicates a location of a first direct current subcarrier on a frequency domain resource, the first direct current subcarrier is a direct current subcarrier corresponding to a transmit frequency used by the second communication apparatus, the frequency domain resource includes frequency domain resources inside and outside a frequency band, and the frequency band is a carrier frequency band corresponding to a subcarrier spacing used by a first communication apparatus; and the second communication apparatus outputs the first information.

In the foregoing technical solution, the second communication apparatus sends, to the first communication apparatus, the information indicates the location of the first direct current subcarrier on the frequency domain resource, so that the first communication apparatus can determine the location of the first direct current subcarrier based on the information that indicates the location of the first direct current subcarrier on the frequency domain resource, and further determine a location of a second direct current subcarrier based on the location of the first direct current subcarrier and a Doppler frequency offset value between the first communication apparatus and the second communication apparatus. In this way, the first communication apparatus can explicitly or implicitly learn whether the direct current subcarriers on receive and transmit sides are within the carrier frequency band corresponding to the first communication apparatus, to properly perform processing, thereby helping the first communication apparatus process a signal.

With reference to the second aspect, in some possible implementations, the first information includes a first index value, and a quantity of subcarriers between the first direct current subcarrier and a start subcarrier of the frequency band is an absolute value of the first index value, where a value range of the first index value is [−X, Y], X is greater than Z and less than or equal to 4096, Y is greater than 3300+Z and less than or equal to 4095, and Z is greater than or equal to 0.

In a conventional technology, a value range of an index value of a direct current subcarrier location indication field is [0, 3300]. 0 to 3299 each indicate a specific location of a direct current subcarrier in a carrier frequency band corresponding to a subcarrier spacing used by a receive end, and 3300 indicates that the direct current subcarrier is outside the carrier frequency band corresponding to the subcarrier spacing used by the receive end. Therefore, the index value in the conventional technology indicates a specific location of a direct current subcarrier in the carrier frequency band corresponding to the subcarrier spacing used by the receive end, but cannot indicate a specific location of the direct current subcarrier outside the carrier frequency band corresponding to the subcarrier spacing used by the receive end.

In the foregoing technical solution, the value range of the index value of the direct current subcarrier location indication field is extended, and a 12-bit unsigned number is extended to a 13-bit signed number, so that the direct current subcarrier location indication field can indicate a specific location of a direct current subcarrier in the carrier frequency band corresponding to the subcarrier spacing used by the first communication apparatus, and can also indicate a specific location of the direct current subcarrier outside the carrier frequency band corresponding to the subcarrier spacing used by the first communication apparatus. In other words, the location of the direct current subcarrier in this embodiment of this application is a location within a larger range, so that the location of the second direct current subcarrier is determined based on the location of the first direct current subcarrier.

With reference to the second aspect, in some possible implementations, the first information includes a second index value and indication information, and a quantity of subcarriers between the first direct current subcarrier and a start subcarrier of the frequency band is the second index value, where the indication information indicates an offset direction of the first direct current subcarrier relative to the start subcarrier, a value range of the second index value is [0, Y], Y is greater than 3300+Z and less than or equal to 4095, and Z is greater than or equal to 0.

In the foregoing technical solution, the value range of the index value of the direct current subcarrier location indication field is extended, and a 12-bit unsigned number still indicates the location of the first direct current subcarrier, but one piece of indication information is added to indicate the offset direction of the first direct current subcarrier relative to the start subcarrier. By using this technical solution, the location of the direct current subcarrier within a larger range can also be indicated, so as to determine the location of the second direct current subcarrier based on the location of the first direct current subcarrier.

With reference to the second aspect, in some possible implementations, the indication information is indicated by using a first Boolean variable.

In the foregoing technical solution, one bit may be added to indicate the offset direction of the first direct current subcarrier relative to the start subcarrier, and bit overheads are low.

With reference to the second aspect, in some possible implementations, Z is obtained by rounding up a normalized maximum Doppler frequency offset value between the first communication apparatus and the second communication apparatus.

In this way, the value ranges of the first index value and the second index value can cover all possible locations of the first direct current subcarrier, to help the second communication apparatus accurately indicate the location of the first direct current subcarrier.

With reference to the second aspect, in some possible implementations, the method further includes: The second communication apparatus determines second information, where the second information indicates the Doppler frequency offset value between the first communication apparatus and the second communication apparatus; and the second communication apparatus outputs the second information.

According to a third aspect, this application provides a method for indicating a direct current subcarrier. The method includes: A first communication apparatus obtains first information and second information, where the first information indicates a location of a first direct current subcarrier inside a frequency band or indicates that the first direct current subcarrier is outside the frequency band, the second information indicates a location of a second direct current subcarrier inside the frequency band or indicates that the second direct current subcarrier is outside the frequency band, the first direct current subcarrier is a direct current subcarrier corresponding to a transmit frequency used by a second communication apparatus, the second direct current subcarrier is a direct current subcarrier corresponding to a receive frequency used by the first communication apparatus, and the frequency band is a carrier frequency band corresponding to a subcarrier spacing used by the first communication apparatus; and the first communication apparatus determines the location of the first direct current subcarrier on the frequency band and the location of the second direct current subcarrier on the frequency band based on the first information and the second information.

In the foregoing technical solution, the first communication apparatus may obtain the information that indicates the location of the first direct current subcarrier on a frequency domain resource and the information that indicates the location of the second direct current subcarrier on the frequency domain resource, to determine the location of the first direct current subcarrier and the location of the second direct current subcarrier. In this way, the first communication apparatus learns whether the direct current subcarriers on receive and transmit sides are within the carrier frequency band corresponding to the first communication apparatus, to properly perform processing, thereby helping the first communication apparatus process a signal.

With reference to the third aspect, in some possible implementations, the first information includes a first index value. When a value of the first index value is within [0, 3299], a quantity of subcarriers between the first direct current subcarrier and a start subcarrier of the frequency band is the first index value; or when the value of the first index value is 3300, the first direct current subcarrier is outside the frequency band. The second information includes a second index value. When a value of the second index value is within [0, 3299], a quantity of subcarriers between the second direct current subcarrier and the start subcarrier of the frequency band is the second index value; or when the value of the second index value is 3300, the second direct current subcarrier is outside the frequency band.

With reference to the third aspect, in some possible implementations, the first information includes a third index value, and a quantity of subcarriers between the first direct current subcarrier and a start subcarrier of the frequency band is the third index value, where a value range of the third index value is [0, Y], Y is greater than or equal to 3300+Z and less than or equal to 4095, and Z is greater than or equal to 0; and the second information includes a subcarrier offset value of the second direct current subcarrier relative to the first direct current subcarrier.

With reference to the third aspect, in some possible implementations, Z is obtained by rounding up a normalized maximum Doppler frequency offset value between the first communication apparatus and the second communication apparatus.

In this way, the value range of the third index value can cover all possible locations of the first direct current subcarrier, to help the second communication apparatus accurately indicate the location of the first direct current subcarrier.

With reference to the third aspect, in some possible implementations, that a first communication apparatus obtains first information and second information includes: The first communication apparatus receives a first message from the second communication apparatus, where the first message includes the first information and the second information.

With reference to the third aspect, in some possible implementations, that a first communication apparatus obtains first information and second information includes: The first communication apparatus receives a first message and a second message from the second communication apparatus, where the first message includes the first information, and the second message includes the second information.

After a system of the second communication apparatus is initialized, the location of the first direct current subcarrier basically remains unchanged, and the location of the second direct current subcarrier changes continuously with the Doppler frequency offset value, and needs to be continuously dynamically indicated. When the first information and the second information are sent by using different messages, after the first information is delivered, only the second information may be continuously dynamically delivered, and the first information is not repeatedly sent, so that signaling overheads can be reduced.

According to a fourth aspect, this application provides a method for indicating a direct current subcarrier. The method includes: A second communication apparatus determines first information and second information, where the first information indicates a location of a first direct current subcarrier inside a frequency band or indicates that the first direct current subcarrier is outside the frequency band, the second information indicates a location of a second direct current subcarrier inside the frequency band or indicates that the second direct current subcarrier is outside the frequency band, the first direct current subcarrier is a direct current subcarrier corresponding to a transmit frequency used by a second communication apparatus, the second direct current subcarrier is a direct current subcarrier corresponding to a receive frequency used by the first communication apparatus, and the frequency band is a carrier frequency band corresponding to a subcarrier spacing used by the first communication apparatus; and the second communication apparatus outputs the first information and the second information.

In the foregoing technical solution, the second communication apparatus sends, to the first communication apparatus, the information that indicates the location of the first direct current subcarrier on a frequency domain resource and the information that indicates the location of the second direct current subcarrier on the frequency domain resource, so that the first communication apparatus can determine the location of the first direct current subcarrier and the location of the second direct current subcarrier. In this way, the first communication apparatus learns whether the direct current subcarriers on receive and transmit sides are within the carrier frequency band corresponding to the first communication apparatus, to properly perform processing, thereby helping the first communication apparatus process a signal.

With reference to the fourth aspect, in some possible implementations, the first information includes a first index value. When a value of the first index value is within [0, 3299], a quantity of subcarriers between the first direct current subcarrier and a start subcarrier of the frequency band is the first index value; or when the value of the first index value is 3300, the first direct current subcarrier is outside the frequency band. The second information includes a second index value. When a value of the second index value is within [0, 3299], a quantity of subcarriers between the second direct current subcarrier and the start subcarrier of the frequency band is the second index value; or when the value of the second index value is 3300, the second direct current subcarrier is outside the frequency band.

With reference to the fourth aspect, in some possible implementations, the first information includes a third index value, and a quantity of subcarriers between the first direct current subcarrier and a start subcarrier of the frequency band is the third index value, where a value range of the third index value is [0, Y], Y is greater than or equal to 3300+Z and less than or equal to 4095, and Z is greater than or equal to 0; and the second information includes a subcarrier offset value of the second direct current subcarrier relative to the first direct current subcarrier.

With reference to the fourth aspect, in some possible implementations, Z is obtained by rounding up a normalized maximum Doppler frequency offset value between the first communication apparatus and the second communication apparatus.

In this way, the value range of the third index value can cover all possible locations of the first direct current subcarrier, to help the second communication apparatus accurately indicate the location of the first direct current subcarrier.

With reference to the fourth aspect, in some possible implementations, that the second communication apparatus outputs the first information and the second information includes: The second communication apparatus sends a first message to the first communication apparatus, where the first message includes the first information and the second information.

With reference to the fourth aspect, in some possible implementations, that the second communication apparatus outputs the first information and the second information includes: The second communication apparatus sends a first message and a second message to the first communication apparatus, where the first message includes the first information, and the second message includes the second information.

After a system of the second communication apparatus is initialized, the location of the first direct current subcarrier basically remains unchanged, and the location of the second direct current subcarrier changes continuously with the Doppler frequency offset value, and needs to be continuously dynamically indicated. When the first information and the second information are sent by using different messages, after the first information is delivered, only the second information may be continuously dynamically delivered, and the first information is not repeatedly sent, so that signaling overheads can be reduced.

According to a fifth aspect, this application provides a communication apparatus. The communication apparatus has a function of implementing the method in the first aspect or any possible implementation of the first aspect, or a function of implementing the method in the second aspect or any possible implementation of the second aspect, or a function of implementing the method in the third aspect or any possible implementation of the third aspect, or a function of implementing the method in the fourth aspect or any possible implementation of the fourth aspect. The function may be implemented through hardware, or may be implemented through hardware executing corresponding software. The hardware or the software includes one or more units corresponding to the function.

According to a sixth aspect, this application provides a communication apparatus, including a processor, a memory, and a transceiver. The memory is configured to store a computer program, and the processor is configured to: invoke and run the computer program stored in the memory, and control the transceiver to receive and send a signal, so that the communication apparatus performs the method in the first aspect or any possible implementation of the first aspect, or performs the method in the second aspect or any possible implementation of the second aspect, or performs the method in the third aspect or any possible implementation of the third aspect, or performs the method in the fourth aspect or any possible implementation of the fourth aspect.

According to a seventh aspect, this application provides a communication apparatus, including a processor and a communication interface. The communication interface is configured to: receive a signal and transmit the received signal to the processor, and the processor processes the signal, so that the method in the first aspect or any possible implementation of the first aspect is performed, or the method in the second aspect or any possible implementation of the second aspect is performed, or the method in the third aspect or any possible implementation of the third aspect is performed, or the method in the fourth aspect or any possible implementation of the fourth aspect is performed.

Optionally, the communication interface may be an interface circuit, and the processor may be a processing circuit.

According to an eighth aspect, this application provides a chip, including a logic circuit and a communication interface. The communication interface is configured to obtain the first information and the second information in the first aspect or any possible implementation of the first aspect, and the logic circuit is configured to perform the determining processing in the first aspect or any possible implementation of the first aspect, to obtain the location of the first direct current subcarrier on the frequency domain resource and the location of the second direct current subcarrier on the frequency domain resource in the first aspect or any possible implementation of the first aspect. Optionally, the communication interface is further configured to output the location of the first direct current subcarrier on the frequency domain resource and the location of the second direct current subcarrier on the frequency domain resource.

Optionally, the communication interface may include an input interface and an output interface. The input interface is configured to obtain the first information and the second information, and the output interface is configured to output the location of the first direct current subcarrier on the frequency domain resource and the location of the second direct current subcarrier on the frequency domain resource.

According to a ninth aspect, this application provides a chip, including a logic circuit and a communication interface. The logic circuit is configured to perform the determining processing in the second aspect or any possible implementation of the second aspect, to obtain the first information in the second aspect or any possible implementation of the second aspect, and the communication interface is configured to output the first information.

Optionally, the determining processing is further used to obtain the second information in the second aspect or any possible implementation of the second aspect.

Optionally, the communication interface may include an input interface and an output interface. The output interface is configured to output the first information and/or the second information.

According to a tenth aspect, this application provides a chip, including a logic circuit and a communication interface. The communication interface is configured to obtain the first information and the second information in the third aspect or any possible implementation of the third aspect, and the logic circuit is configured to perform the determining processing in the third aspect or any possible implementation of the third aspect, to obtain the location of the first direct current subcarrier on the frequency domain resource and the location of the second direct current subcarrier on the frequency domain resource in the third aspect or any possible implementation of the third aspect. Optionally, the communication interface is further configured to output the location of the first direct current subcarrier on the frequency domain resource and the location of the second direct current subcarrier on the frequency domain resource.

Optionally, the communication interface may include an input interface and an output interface. The input interface is configured to obtain the first information and the second information, and the output interface is configured to output the location of the first direct current subcarrier on the frequency domain resource and the location of the second direct current subcarrier on the frequency domain resource.

According to an eleventh aspect, this application provides a chip, including a logic circuit and a communication interface. The logic circuit is configured to perform the determining processing in the fourth aspect or any possible implementation of the fourth aspect, to obtain the first information and the second information in the fourth aspect or any possible implementation of the fourth aspect, and the communication interface is configured to output the first information and the second information.

Optionally, the communication interface may include an input interface and an output interface. The output interface is configured to output the first information and the second information.

According to a twelfth aspect, this application provides a computer-readable storage medium. The computer-readable storage medium stores computer instructions. When the computer instructions are run on a computer, the method in the first aspect or any possible implementation of the first aspect is performed, or the method in the second aspect or any possible implementation of the second aspect is performed, or the method in the third aspect or any possible implementation of the third aspect is performed, or the method in the fourth aspect or any possible implementation of the fourth aspect is performed.

According to a thirteenth aspect, this application provides a computer program product. The computer program product includes computer program code. When the computer program code is run on a computer, the method in the first aspect or any possible implementation of the first aspect is performed, or the method in the second aspect or any possible implementation of the second aspect is performed, or the method in the third aspect or any possible implementation of the third aspect is performed, or the method in the fourth aspect or any possible implementation of the fourth aspect is performed.

According to a fourteenth aspect, this application provides a wireless communication system, including the communication apparatus in the fifth aspect, the sixth aspect, or the seventh aspect.

DESCRIPTION OF EMBODIMENTS

Figure 1:
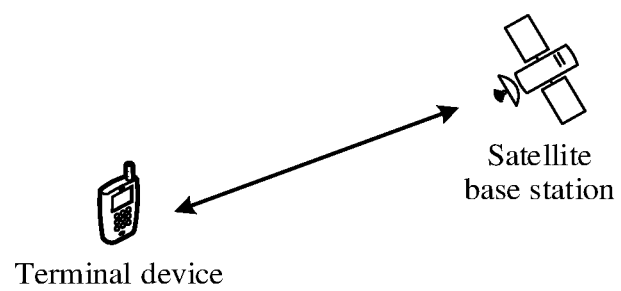
FIG. 1 is a schematic diagram of an architecture of a communication system to which embodiments of this application are applicable.

The following describes technical solutions of this application with reference to the accompanying drawings.

The technical solutions in embodiments of this application may be applied to various communication systems, for example, a long term evolution (LTE) system, an LTE frequency division duplex (FDD) system, an LTE time division duplex (TDD) system, a universal mobile telecommunication system (UMTS), a worldwide interoperability for microwave access (WiMAX) communication system, a 5th generation (5G) system, or new radio (NR), a satellite communication system, and a future mobile communication system.

The terminal device in embodiments of this application may also be referred to as user equipment (UE), a user, an access terminal, a subscriber unit, a subscriber station, a mobile station, a remote station, a remote terminal, a mobile device, a user terminal, a terminal, a wireless communication device, a user agent, a user apparatus, or the like. The terminal device may be a cellular phone, a smartwatch, a wireless data card, a mobile phone, a tablet computer, a personal digital assistant (PDA) computer, a wireless modem, a handheld device, a laptop computer, a machine type communication (MTC) terminal, a computer with a wireless transceiver function, a virtual reality terminal device, an augmented reality terminal device, a wireless terminal in industrial control, a wireless terminal in self driving, a wireless terminal in remote surgery, a wireless terminal in a smart grid, a wireless terminal in transportation safety, a wireless terminal in a smart city, a wireless terminal in a smart home, a wireless terminal (for example, a satellite phone or a satellite terminal) in satellite communication, or the like. A specific technology and a specific device form that are used by the terminal device are not limited in embodiments of this application.

A network device in embodiments of this application may be a device configured to communicate with the terminal device, and the network device may be a base transceiver station (BTS) in a global system for mobile communication (GSM) or code division multiple access (CDMA), may be a NodeB (NB) in a wideband code division multiple access (WCDMA) system, may be an evolved NodeB (eNB or eNodeB) in an LTE system, or may be a wireless controller in a cloud radio access network (CRAN) scenario, or the network device may be a relay station, an access point, a vehicle-mounted device, or a wearable device, or the network device may be a terminal that performs a function of a base station in D2D communication or machine communication, or the network device may be a network device in a 5G network, a network device in a future evolved PLMN network, or the like. This is not limited in embodiments of this application. In addition, the network device in embodiments of this application may alternatively be a module or a unit that completes some functions of the base station, for example, may be a central unit (CU), or may be a distributed unit (DU). A specific technology and a specific device form that are used by the network device are not limited in embodiments of this application.

The terminal device and the network device in embodiments of this application may be deployed on land, including indoor, outdoor, handheld, or in-vehicle devices, or may be deployed on a water surface; or may be deployed on an aircraft, a balloon, and a satellite in the air. Application scenarios of the network device and the terminal device are not limited in embodiments of this application.

The terminal device and the network device in embodiments of this application may communicate with each other by using a licensed spectrum, or communicate with each other by using an unlicensed spectrum, or may communicate with each other by using both a licensed spectrum and an unlicensed spectrum. The terminal device and the network device may communicate with each other by using a spectrum below 6 gigahertz (GHz), or may communicate with each other by using a spectrum above 6 GHz, or may communicate with each other by using both a spectrum below 6 GHz and a spectrum above 6 GHz. A spectrum resource used between the terminal device and the network device is not limited in embodiments of this application.

The following describes in detail the technical solutions in embodiments of this application by using a satellite communication system as an example.

FIG. 1 is a schematic diagram of an architecture of a communication system to which embodiments of this application are applicable.

As shown in FIG. 1, the communication system may include at least one network device, for example, a satellite base station shown in FIG. 1. The communication system may further include at least one terminal device, for example, a terminal device shown in FIG. 1. The network device may communicate with the terminal device by using a wireless link. The satellite communication system shown in FIG. 1 is used as an example. The satellite base station may transmit downlink data to the terminal device. The downlink data is encoded by using channel coding, and the downlink data obtained after channel coding is transmitted to the terminal device after constellation modulation. The terminal device may transmit uplink data to the satellite base station. The uplink data may also be encoded by using channel coding, and the encoded data is transmitted to the satellite base station after constellation modulation.

The satellite base station in FIG. 1 is an apparatus that provides a communication service function for the terminal device. Forms of the satellite base station include but are not limited to a satellite, an aircraft, a hot air balloon, an aerial relay, or another apparatus having a signal transmission function. Functional names of the satellite base station include but are not limited to a satellite, a network side, a base station, an access point, a big cell, a small cell, a pseudo base station, a macro base station, and the like. In systems using different wireless access technologies, names of devices having a base station function may be different. For more specific descriptions, refer to the foregoing description of the network device. Details are not described herein again.

Forms of the terminal device in FIG. 1 include but are not limited to various handheld devices having a wireless communication function, in-vehicle devices, wearable devices, computing devices, or other processing devices connected to a wireless modem. For more specific descriptions, refer to the foregoing description of the terminal device. Details are not described herein again.

Satellite communication is less affected by geographical conditions and can achieve the goal of global coverage. Therefore, the development of satellite communication is of great significance. Especially, when local infrastructure communication facilities are severely damaged and normal communication cannot be performed due to natural disasters, satellite communication can provide powerful communication guarantee for effective disaster relief. In addition, in some areas that are not conducive to erection of ground base stations, including oceans, deserts, mountains, and the like, effective communication can be performed by using satellite communication, to ensure full coverage of communication.

At present, a satellite base station in other types of satellite communication systems other than a synchronous orbit satellite communication system has a particular moving speed relative to the earth, and a smaller orbit height indicates a higher relative speed. Because the relative speed between the satellite base station and the terminal device is high, a large Doppler frequency offset is generated between the satellite base station and the terminal device. For example, in a low earth orbit (LEO) satellite system, when an orbit height is less than 700 km, a Doppler frequency offset range may reach −83.8 kHz to 83.8 kHz. Therefore, Doppler frequency offset compensation needs to be performed on a satellite base station side or on a terminal device side. Otherwise, decoding performance is affected, and even the system cannot work.

Commonly used Doppler frequency offset compensation methods include an analog end frequency offset compensation method and a digital end frequency offset compensation method.

(1) Analog End Frequency Offset Compensation Method

The analog end frequency offset compensation method is to adjust or compensate for a Doppler frequency offset by adjusting a crystal oscillator of a transmitter or a receiver. The analog end frequency offset compensation method may be divided into transmit end analog frequency offset pre-compensation and receive end analog frequency offset post-compensation.

Figure 2:
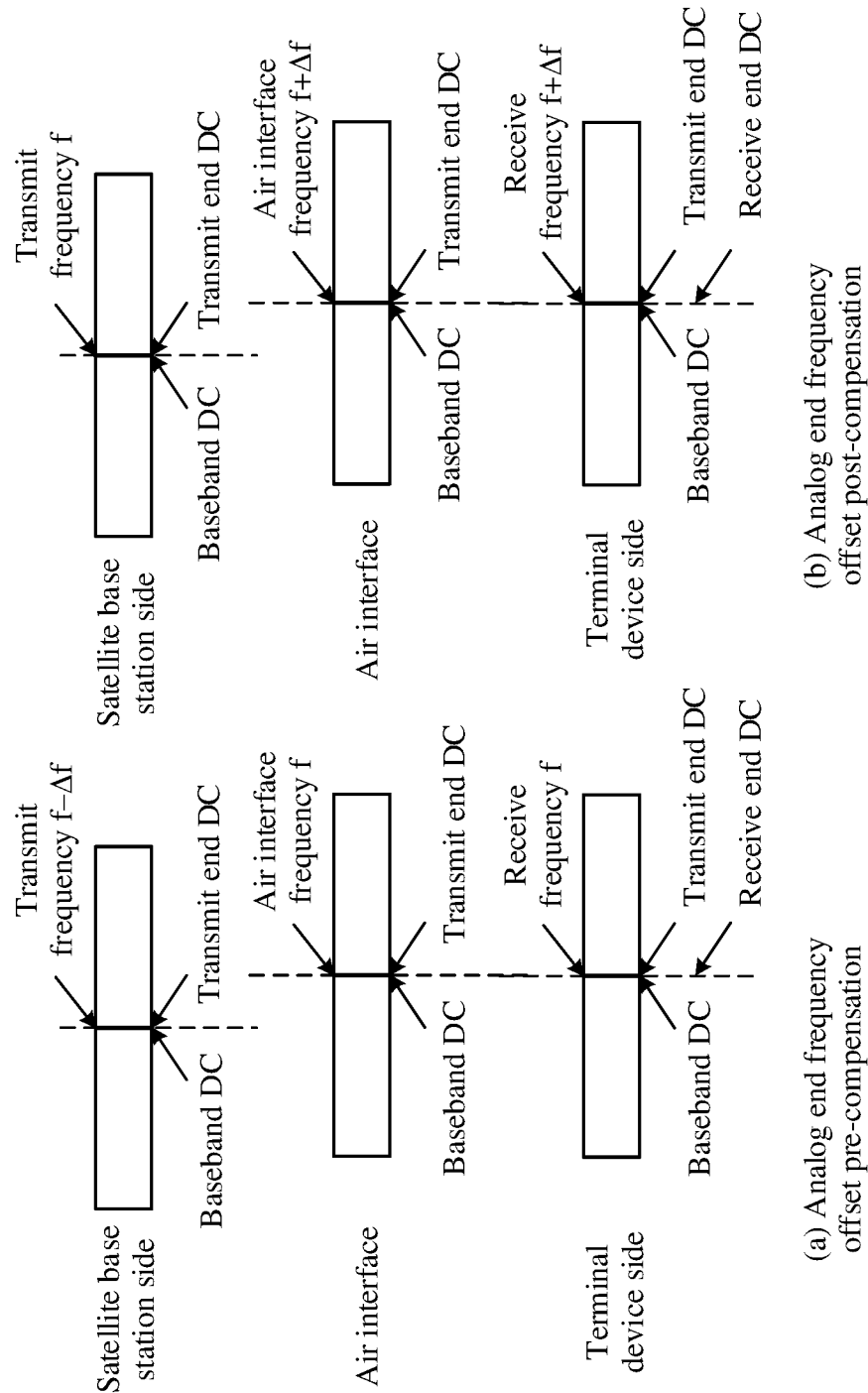
FIG. 2 is a schematic diagram of an analog end frequency offset compensation method.

FIG. 2 is a schematic diagram of an analog end frequency offset compensation method. In FIG. 2, an example in which a transmit end is a satellite base station and a receive end is a terminal device is used. This is similar to an example in which a transmit end is a terminal device, and a receive end is a satellite base station.

The transmit end analog frequency offset pre-compensation is shown in (a) in FIG. 2. A transmit frequency of the satellite base station is set to f−Δf, and Δf is a pre-compensated Doppler frequency offset. In this case, a channel center frequency is f−Δf, and a baseband direct current (DC) and a transmit end DC are on f−Δf. After undergoing the Doppler frequency offset of the satellite base station, the channel center frequency changes to f, and the baseband DC and the transmit end DC are on f. The terminal device receives a signal on the receive frequency f.

The transmit end analog frequency offset post-compensation is shown in (b) in FIG. 2. A transmit frequency of the satellite base station is set to f. In this case, a channel center frequency is f, and a baseband DC and a transmit end DC are on f. After undergoing a Doppler frequency offset of the satellite base station, the channel center frequency changes to f+Δf, and the baseband DC and the transmit end DC are on f+Δf. Δf is the pre-compensated Doppler frequency offset. The terminal device receives a signal on the receive frequency f+Δf.

In a scenario in which a transmit end is a terminal device, and a receive end is a satellite base station, an implementation is similar, and details are not described again.

It can be learned that, by using the analog end frequency offset compensation method, the transmit end DC and the receive end DC can be coincident, and a difference between the two is caused only by a Doppler frequency offset generated by movement of the terminal device and a crystal oscillator error between the transmit and receive ends, and an impact range is very small.

However, due to a limitation of a crystal oscillator device, a Doppler frequency adjustment range that can be implemented by a current analog end frequency offset compensation method is very limited. For example, in a case of +2 ppm, in a 3G frequency band, only an adjustment of +6 kHz can be implemented, and a requirement of satellite communication cannot be satisfied.

(2) Digital End Frequency Offset Compensation Method

In the analog end frequency offset compensation method, spectrum shifting is implemented by adjusting a baseband signal, to adjust or compensate for a Doppler frequency offset. The digital end frequency offset compensation method may also be divided into transmit end digital frequency offset pre-compensation and receive end digital frequency offset post-compensation.

Figure 3:
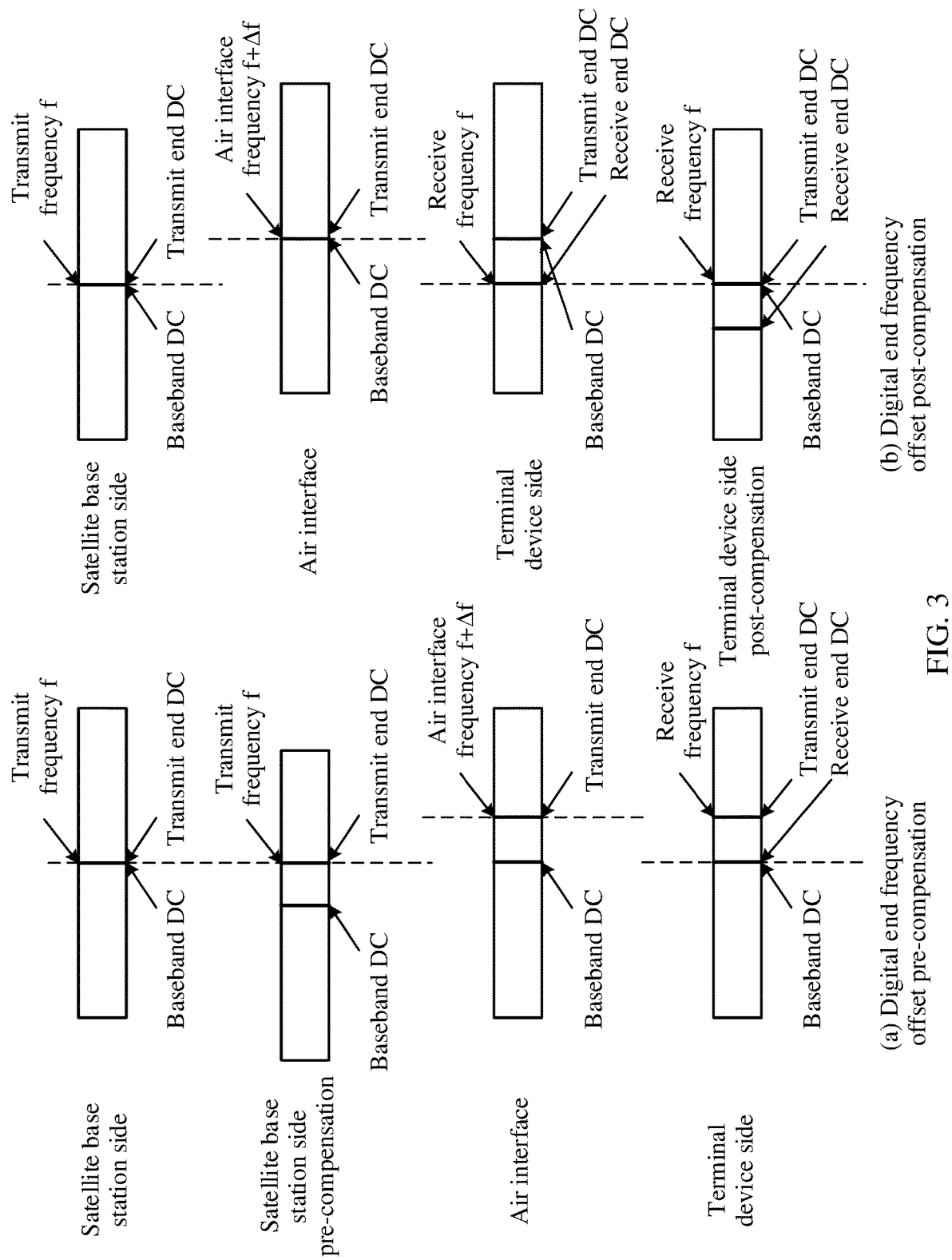
FIG. 3 is a schematic diagram of a digital end frequency offset compensation method.

FIG. 3 is a schematic diagram of a digital end frequency offset compensation method. In FIG. 3, the example in which a transmit end is a satellite base station and a receive end is a terminal device is still used.

The transmit end analog frequency offset pre-compensation is shown in (a) in FIG. 3. A transmit frequency of the satellite base station is set to f, to be specific, a baseband DC and a transmit end DC are on the frequency f; through spectrum shifting in digital domain, a Doppler frequency offset of the satellite base station is pre-compensated for, so that a channel center frequency is f−Δf, to be specific, the baseband DC is on the frequency f−Δf, and the transmit end DC is on the frequency f. Δf is the pre-compensated Doppler frequency offset. After undergoing the Doppler frequency offset of the satellite base station, the channel center frequency changes to f, to be specific, the baseband DC is on f, and the transmit end DC is on f+Δf. The terminal device receives a signal on the receive frequency f. In this case, the transmit end DC is on f+Δf, and the receive end DC is on f.

The transmit end analog frequency offset post-compensation is shown in (b) in FIG. 3. A transmit frequency of the satellite base station is set to f, to be specific, a baseband DC and a transmit end DC are on the frequency f. After undergoing a Doppler frequency offset of the satellite base station, a channel center frequency changes to f+Δf, to be specific, the baseband DC and the transmit end DC are on f+Δf. Δf is the pre-compensated Doppler frequency offset. The terminal device receives a signal on the receive frequency f. In this case, the transmit end DC is on f+Δf, and the receive end DC is on f. Through spectrum shifting in digital domain, the Doppler frequency offset of the satellite base station is pre-compensated for, so that the channel center frequency is f.

In a scenario in which a transmit end is a terminal device, and a receive end is a satellite base station, an implementation is similar, and details are not described again.

It can be learned that, by using the digital end frequency offset compensation method, the transmit end DC and the receive end DC cannot be coincident. When only the Doppler frequency offset of the satellite base station is considered, the transmit end DC and the receive end DC may be spaced by tens of kHz, for example, when a height of an LEO is less than 700 km, a maximum spacing is 83.8 kHz.

A direct current leakage phenomenon may exist in the transmitter and the receiver (to be specific, a phenomenon of spectrum central bulge caused by existence of a direct current signal). In addition, direct current leakage causes interference to a plurality of subcarriers adjacent to a location of the center frequency, affecting a bandwidth part (BWP) of the receive end. Therefore, the receive end needs to learn whether a subcarrier affected by direct current leakage exists in the receive bandwidth, and further performs different processing based on whether a subcarrier affected by the direct current leakage exists in the receive bandwidth. For ease of description, subcarriers affected by direct current leakage are collectively referred to as direct current subcarriers below.

Because a relative speed between the satellite base station and the terminal device is high, a large Doppler frequency offset is generated between the satellite base station and the terminal device. Based on the foregoing analysis, in a satellite communication scenario, the digital end frequency offset compensation method needs to be used for an analog end frequency offset. However, when the digital end frequency offset compensation method is used, a phenomenon occurs that the transmit end DC and the receive end DC cannot be coincident, that is, a direct current subcarrier corresponding to the transmit end and a direct current subcarrier corresponding to the receive end may not be located at a same location. However, currently, no technical solution can enable the receive end to learn both a location of the direct current subcarrier corresponding to the transmit end and a location of the direct current subcarrier corresponding to the receive end.

For the foregoing problem, this application provides a method for indicating a direct current subcarrier and a communication apparatus, so that a receive end can learn both a location of a direct current subcarrier corresponding to a transmit end and a location of a direct current subcarrier corresponding to the receive end, to help the receive end process a signal.

It should be noted that, the foregoing uses only the satellite communication system as an example. The technical solution of this application may also be applicable to another communication system with a similar problem. This is not specifically limited in this embodiment of this application.

The following describes a method for indicating a direct current subcarrier according to an embodiment of this application.

(1)

Figure 4:
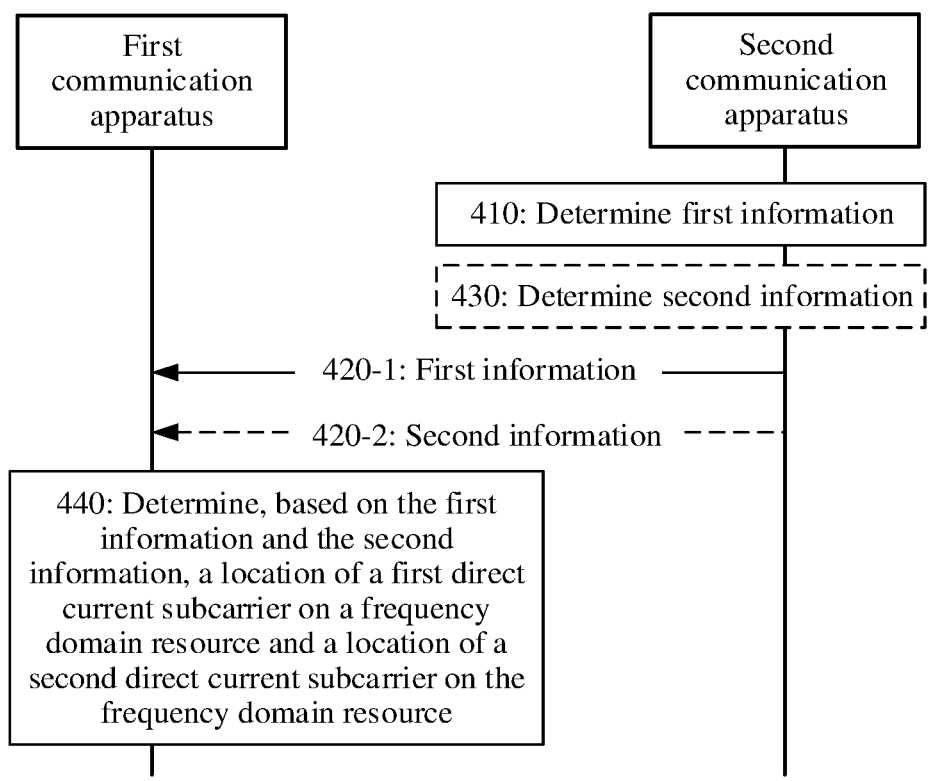
FIG. 4 is a schematic flowchart of a method for indicating a direct current subcarrier according to an embodiment of this application.

FIG. 4 is a schematic flowchart of a method for indicating a direct current subcarrier according to an embodiment of this application. A first communication apparatus in FIG. 4 may correspond to the foregoing receive end, and a second communication apparatus in FIG. 4 may correspond to the foregoing transmit end. Optionally, the first communication apparatus is a terminal device, and the second communication apparatus is a network device. Optionally, the first communication apparatus is a network device, and the second communication apparatus is a terminal device. The method shown in FIG. 4 may include at least some of the following content.

In step 410, the second communication apparatus determines first information.

In this embodiment of this application, the first information indicates a location of a direct current subcarrier corresponding to a transmit frequency used by the second communication apparatus, and second information indicates a Doppler frequency offset value between the first communication apparatus and the second communication apparatus.

Optionally, the direct current subcarrier corresponding to the transmit frequency may be understood as a subcarrier affected by a direct current signal of the transmit frequency, for example, a subcarrier affected by the transmit end DC shown in FIG. 2 or FIG. 3.

Optionally, in this embodiment of this application, the location of the direct current subcarrier may be a location inside a carrier frequency band corresponding to a subcarrier spacing used by the first communication apparatus, or may be a location outside the carrier frequency band corresponding to the subcarrier spacing used by the first communication apparatus. In other words, the location of the direct current subcarrier in this embodiment of this application is a location within a larger range. For ease of description, the carrier frequency band corresponding to the subcarrier spacing used by the first communication apparatus is referred to as a carrier frequency band of the first communication apparatus for short below.

Optionally, the location of the direct current subcarrier may be a location relative to a start subcarrier of the carrier frequency band of the first communication apparatus. For example, the location of the direct current subcarrier may be a location relative to a point A. For ease of description, the start subcarrier of the carrier frequency band of the first communication apparatus is referred to as a start subcarrier for short below.

In step 420, the first communication apparatus obtains the first information and second information.

A manner in which the first communication apparatus obtains the first information is not specifically limited in this embodiment of this application.

In some implementations, as shown in FIG. 4, the first communication apparatus may receive the first information from the second communication apparatus. Specifically, step 420-1 may be performed, that is, the second communication apparatus sends the first information to the first communication apparatus, and correspondingly, the first communication apparatus receives the first information from the second communication apparatus.

A manner in which the first communication apparatus obtains the second information is not specifically limited in this embodiment of this application.

In some implementations, as shown in FIG. 4, the first communication device may receive the second information from the second communication apparatus. Specifically, step 420-2 may be performed, that is, the second communication apparatus sends the second information to the first communication apparatus, and correspondingly, the first communication apparatus receives the second information from the second communication apparatus.

Optionally, before sending the second information, the second communication apparatus determines the second information, that is, performs step 430. A manner in which the second communication apparatus determines the Doppler frequency offset value between the first communication apparatus and the second communication apparatus is not specifically limited in this embodiment of this application.

In some other implementations, the first communication apparatus may autonomously determine the second information, that is, the first communication apparatus determines the Doppler frequency offset value between the first communication apparatus and the second communication apparatus. A manner in which the first communication apparatus determines the Doppler frequency offset value between the first communication apparatus and the second communication apparatus is not specifically limited in this embodiment of this application.

When the first communication apparatus obtains the first information and the second information from the second communication apparatus, the second communication apparatus may send the first information and the second information to the first communication apparatus in one message, or may separately send the first information and the second information to the first communication apparatus in a plurality of messages. This is not specifically limited in this embodiment of this application.

A form of the first information is not specifically limited in this embodiment of this application.

In some embodiments, the first information includes a first index value. A value range of the first index value is [−X, Y], X is greater than Z and less than or equal to 4096, Y is greater than 3300+Z and less than or equal to 4095, and Z is greater than or equal to 0. A quantity of subcarriers between a first direct current subcarrier and the start subcarrier is an absolute value of the first index value. In other words, the first index value is a signed number, and can effectively indicate a location of the first direct current subcarrier inside the carrier frequency band of the first communication apparatus and a location of the first direct current subcarrier outside the carrier frequency band of the first communication apparatus (for example, outside an upper edge of the carrier frequency band of the first communication apparatus or outside a lower edge of the carrier frequency band of the first communication apparatus).

For example, the value range of the first index value is [−1000, 3999], and the first index value in the first information is −500. The absolute value of the first index value is 500. This means that the first direct current subcarrier is spaced from the start subcarrier by 500 subcarriers. The first index value is negative. This means that the first direct current subcarrier is outside the lower edge of the carrier frequency band of the first communication apparatus.

In another example, the value range of the first index value is [−4096, 4095], and the first index value in the first information is 3998. The absolute value of the first index value is 3998. This means that the first direct current subcarrier is spaced from the start subcarrier by 3998 subcarriers. The first index value is positive. This means that the first direct current subcarrier is not outside the lower edge of the carrier frequency band of the first communication apparatus.

Optionally, Z is obtained by rounding up a normalized maximum Doppler frequency offset value between the first communication apparatus and the second communication apparatus. In this way, the value range of the first index value can cover all possible locations of the first direct current subcarrier, to help the second communication apparatus accurately indicate the location of the first direct current subcarrier.

In some other embodiments, the first information includes a second index value and indication information. A value range of the second index value is [0, Y]. Y is greater than 3300+Z and less than or equal to 4095, and Z is greater than or equal to 0. The indication information indicates an offset direction of the first direct current subcarrier relative to a start subcarrier. A quantity of subcarriers between the first direct current subcarrier and the start subcarrier is the second index value. In other words, the second index value is an unsigned number, and the second index value together with the indication information can effectively indicate the location of the first direct current subcarrier inside the carrier frequency band of the first communication apparatus and the location of the first direct current subcarrier outside the carrier frequency band of the first communication apparatus.

For example, the value range of the second index value is [0, 3999], the second index value in the first information is 500, and the indication information indicates that the first direct current subcarrier is offset downward relative to the start subcarrier. The second index value is 500. This means that the first direct current subcarrier is spaced from the start subcarrier by 500 subcarriers. The indication information indicates that the first direct current subcarrier is offset downward relative to the start subcarrier. This means that the first direct current subcarrier is outside the lower edge of the carrier frequency band of the first communication apparatus and is at a location 500 subcarriers away from the start subcarrier.

In another example, the value range of the second index value is [0, 3999]. The second index value in the first information is 500. The indication information indicates that the first direct current subcarrier is offset upward relative to the start subcarrier. The second index value is 500. This means that the first direct current subcarrier is spaced from the start subcarrier by 500 subcarriers. The indication information indicates that the first direct current subcarrier is offset upward relative to the start subcarrier. This means that the first direct current subcarrier is above the lower edge of the carrier frequency band of the first communication apparatus and is at a location 500 subcarriers away from the start subcarrier.

Optionally, the second communication apparatus may send the second index value and the indication information to the first communication apparatus in one message, or may separately send the second index value and the indication information to the first communication apparatus by using a plurality of messages. This is not specifically limited in this embodiment of this application.

Optionally, the indication information may be indicated by using a Boolean variable.

Optionally, Z is obtained by rounding up a normalized maximum Doppler frequency offset value between the first communication apparatus and the second communication apparatus. In this way, the value range of the second index value can cover all possible locations of the first direct current subcarrier, to help the second communication apparatus accurately indicate the location of the first direct current subcarrier.

In step 440, the first communication apparatus determines, based on the first information and the second information, a location of the first direct current subcarrier on a frequency domain resource of the first communication apparatus and a location of a second direct current subcarrier on the frequency domain resource of the first communication apparatus. The second direct current subcarrier is a direct current subcarrier corresponding to a receive frequency used by the first communication apparatus.

Optionally, the direct current subcarrier corresponding to the receive frequency may be understood as a subcarrier affected by a direct current signal of the receive frequency, for example, a subcarrier affected by the receive end DC shown in FIG. 2 or FIG. 3.

In some possible implementations, the first communication apparatus may determine the location of the first direct current subcarrier based on the first index value included in the first information. The first communication apparatus may compensate for, based on the second index value, the Doppler frequency offset value indicated by the second information, to obtain the location of the second direct current subcarrier.

In some possible implementations, the first communication apparatus may determine the location of the first direct current subcarrier based on the second index value and the indication information that are included in the first information. The first communication apparatus may compensate for, based on the location of the first direct current subcarrier, the Doppler frequency offset value indicated by the second information, to obtain the location of the second direct current subcarrier.

This embodiment of this application is described in detail below with reference to specific examples.

Example 1

A value range of a field (txDirectCurrentLocation) indicates a direct current subcarrier in SCS-SpecificCarrier defined in the protocol 38.331 is [0, 4095]. 0 to 3300 are valid indexes, each of which indicates a location of a transmit end DC relative to the point A in a unit of subcarrier. 3301 to 4095 are invalid/reserved. Specifically, 0 to 3299 indicate that the direct current subcarrier is inside a carrier frequency band corresponding to a subcarrier spacing used by a receive end, and 3300 indicates that the direct current subcarrier is outside the carrier frequency band corresponding to the subcarrier spacing used by the receive end. The value range of the txDirectCurrentLocation field is represented by a 12-bit (bit) unsigned number.

In this example, a valid index range that is of the foregoing field indicating a direct current subcarrier and that is defined in the protocol 38.331 may be extended to [−X, Y]. A value range of X may be [Z, 4096], and a value range of Y may be [3300+Z. 4095]. Z is greater than or equal to 0, indicating the location of the transmit end DC relative to the point A in the unit of subcarrier. The extended value range of the txDirectCurrentLocation field is represented by a 13-bit signed number. Details are as follows:

ASN1START
--TAG-SCS-SPECIFICCARRIER-START
SCS-SpecificCarrier::=SEQUENCE {
    offsetToCarrier INTEGER (0 . . . 2199),
    subcarrierSpacing SubcarrierSpacing,
    carrierBandwidth INTEGER (1 . . . maxNrofPhysical-ResourceBlocks),
    . . . ,
    [[
    txDirectCurrentLocation INTEGER (−X . . . Y) OPTIONAL --Need S
    ]]
}
--TAG-SCS-SPECIFICCARRIER-STOP
--ASN1STOP For example, the valid index range of the foregoing field that indicates a direct current subcarrier is extended to [−1500, 4500].

Optionally, [−4096, −(X+1)] and [Y+1, 4095] may be reserved, or may be used for valid indication.

The second communication apparatus may send the first information to the first communication apparatus by using improved SCS-SpecificCarrier.

The first communication apparatus determines the Doppler frequency offset value between the first communication apparatus and the second communication apparatus. The first communication apparatus may determine, based on the determined Doppler frequency offset value and an index that is in the first information and that indicates the location of the direct current subcarrier corresponding to the transmit frequency used by the second communication apparatus, a location of the direct current subcarrier corresponding to the receive frequency used by the first communication apparatus relative to the point A. In this way, the first communication apparatus can explicitly or implicitly learn whether direct current subcarriers on receive and transmit sides are within a BWP corresponding to the first communication apparatus. The direct current subcarrier corresponding to the receive frequency used by the first communication apparatus and/or the direct current subcarrier corresponding to the transmit frequency used by the second communication apparatus are within the BWP corresponding to the first communication apparatus, and the first communication apparatus may autonomously choose to perform puncturing or use data or a pilot of the subcarrier at this location for decoding.

Example 2

Example 2 is similar to Example 1, and a difference lies in that the first communication apparatus obtains the second information from the second communication apparatus.

An RRC information element may be modified or added. Details are as follows:
--ASN1START
--TAG-NTN-SPECIFICCONFIG-START
    NTN-SPECIFIC-CONFIG::=Sequence {
        NTN_Doppler_Value BIT STRING (SIZE (n))
    }
--TAG-NTN-SPECIFICCONFIG-STOP
--ASN1STOP The first communication apparatus obtains the Doppler frequency offset value between the first communication apparatus and the second communication apparatus, and the index that is in the first information and that indicates the location of the direct current subcarrier corresponding to the transmit frequency used by the second communication apparatus, and then determines whether the direct current subcarriers on the receive and transmit ends are within the BWP corresponding to the first communication apparatus.

Example 3

SCS-SpecificCarrier defined by the protocol 38.331 is also improved. In this example, the valid index range of the foregoing field that indicates a direct current subcarrier is modified to [0, Y], Y is greater than 3300+Z and less than or equal to 4095, and Z is greater than or equal to 0, indicating a quantity of subcarriers between the transmit end DC and the point A. A txDirectCurrentLocation Direction field is added to SCS-SpecificCarrier to indicate an offset direction of the transmit end DC relative to the point A. The improved value range of the txDirectCurrentLocation field is still represented by a 12-bit (bit) unsigned number. Details are as follows:

ASN1START
--TAG-SCS-SPECIFICCARRIER-START
SCS-SpecificCarrier::=SEQUENCE {
    offsetToCarrier INTEGER (0 . . . 2199),
    subcarrierSpacing SubcarrierSpacing,
    carrierBandwidth INTEGER (1 . . . maxNrofPhysical-ResourceBlocks),
    txDirectCurrentLocation INTEGER (0 . . . Y)
    . . . ,
    [[
    txDirectCurrentLocation Direction BOOLEAN OPTIONAL --Need S
    ]]
}
--TAG-SCS-SPECIFICCARRIER-STOP
--ASN1STOP Optionally, [Y+1, 4095] may be reserved, or may be used for valid indication.

The second communication apparatus may send the first information to the first communication apparatus by using improved SCS-SpecificCarrier.

The first communication apparatus can explicitly or implicitly learn whether the direct current subcarriers on the receive and transmit ends are within the BWP corresponding to the first communication apparatus based on the Doppler frequency offset value that is between the first communication apparatus and the second communication apparatus and that is determined by the first communication apparatus or received from the second communication apparatus, and the index that is in the first information and that indicates the location of the direct current subcarrier corresponding to the transmit frequency used by the second communication apparatus.

(2)

Figure 5:
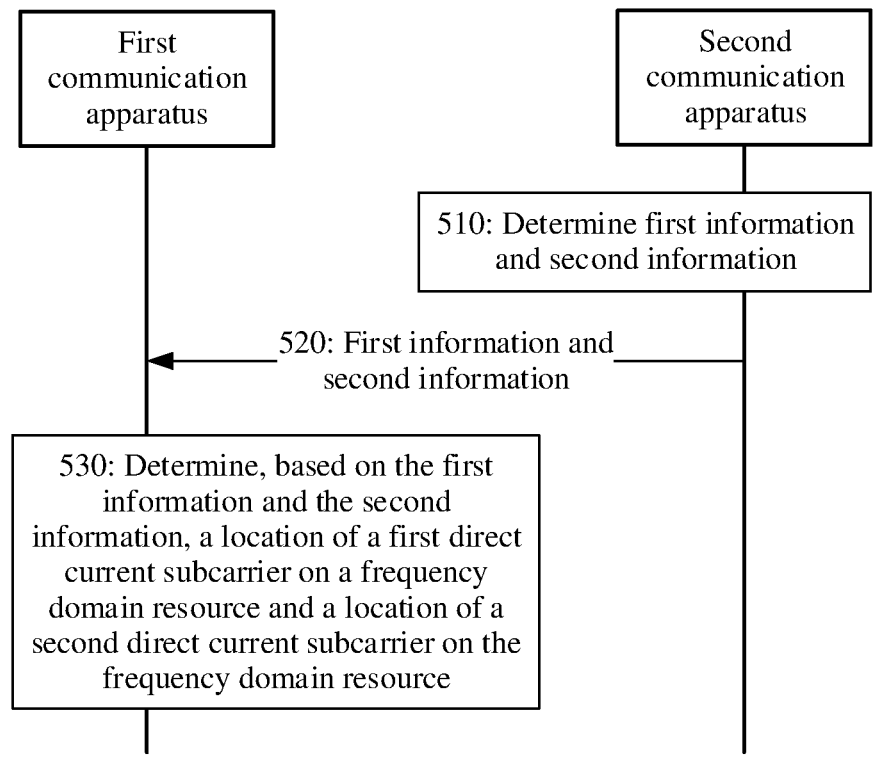
FIG. 5 is a schematic flowchart of a method for indicating a direct current subcarrier according to another embodiment of this application.

FIG. 5 is a schematic flowchart of a method for indicating a direct current subcarrier according to another embodiment of this application. A first communication apparatus in FIG. 5 may correspond to the foregoing receive end, and a second communication apparatus in FIG. 5 may correspond to the foregoing transmit end. Optionally, the first communication apparatus is a terminal device, and the second communication apparatus is a network device. Optionally, the first communication apparatus is a network device, and the second communication apparatus is a terminal device. The method shown in FIG. 5 may include at least some of the following content.

It should be noted that, for specific descriptions of a first direct current subcarrier, a second direct current subcarrier, locations of direct current subcarriers, a carrier frequency band and a start subcarrier of the first communication apparatus, and the like, refer to the foregoing related descriptions. Details are not described herein again.

In step 510, the second communication apparatus determines first information and second information. The first information indicates a location of the first direct current subcarrier inside the carrier frequency band of the first communication apparatus or indicates that the first direct current subcarrier is outside the carrier frequency band of the first communication apparatus, and the second information indicates a location of the second direct current subcarrier inside the carrier frequency band of the first communication apparatus or indicates that the second direct current subcarrier is outside the carrier frequency band of the first communication apparatus.

In some embodiments, the second communication apparatus separately displays the location of the first direct current subcarrier and the location of the second direct current subcarrier to the first communication apparatus. In some possible implementations, the first information includes a first index value, and the second information includes a second index value. Value ranges of the first index value and the second index value are [0, 4095]. When a value of the first index value is within [0, 3299], a quantity of subcarriers between the first direct current subcarrier and the start subcarrier is the first index value; or when the value of the first index value is 3300, the first direct current subcarrier is outside the carrier frequency band of the first communication apparatus. When a value of the second index value is within [0, 3299], a quantity of subcarriers between the second direct current subcarrier and the start subcarrier is the second index value; or when the value of the second index value is 3300, the second direct current subcarrier is outside the carrier frequency band of the first communication apparatus.

In some other embodiments, the second communication apparatus explicitly indicates the location of the first direct current subcarrier to the first communication apparatus, and indirectly indicates the location of the second direct current subcarrier to the first communication apparatus. In some possible implementations, the first information includes a third index value, the second information includes a subcarrier offset value of the second direct current subcarrier relative to the first direct current subcarrier, and a quantity of subcarriers between the first direct current subcarrier and the start subcarrier is the third index value. A value range of the third index value is [0, Y]. Y is greater than or equal to 3300+Z and less than or equal to 4095, and Z is greater than or equal to 0.

Optionally, a value range of a subcarrier offset value of the second direct current subcarrier relative to the first direct current subcarrier is [−Z, Z], where Z is greater than or equal to 0.

Optionally, Z is obtained by rounding up a normalized maximum Doppler frequency offset value between the first communication apparatus and the second communication apparatus. In this way, the value range of the third index value can cover all possible locations of the first direct current subcarrier, to help the second communication apparatus accurately indicate the location of the first direct current subcarrier.

In step 520, the second communication apparatus sends the first information and the second information to the first communication apparatus. Correspondingly, the first communication apparatus receives the first information and the second information from the second communication apparatus.

In some embodiments, the second communication apparatus sends the first information and the second information to the first communication apparatus by using a plurality of messages. In some possible implementations, the second communication apparatus sends a first message and a second message to the first communication apparatus. The first message includes the first information, and the second message includes the second information.

For example, when the first information includes the first index value and the second information includes the second index value, the second communication apparatus may separately send an RRC message structure SCS-SpecificCarrier that is used to transmit the first information and that is defined by the protocol 38.331 and an RRC message structure SCS-SpecificCarrier that is used to transmit the second information and that is defined by the protocol 38.331. For description of the RRC message structure SCS-SpecificCarrier defined in the protocol 38.331, refer to the foregoing description. Details are not described herein again.

In another example, when the first information includes the first index value, and the second information includes the second index value, a new RRC information element may be added, to separately transmit direct current subcarrier location information caused by a Doppler frequency offset, that is, location information of the second direct current subcarrier. The second communication apparatus may send the first information by using an RRC message structure SCS-SpecificCarrier defined in the protocol 38.331, and send the second information by using the newly added RRC information element.

Optionally, the newly added RRC information element may be as follows:

```
--ASNISTART
--TAG-NTN-SPECIFICCONFIG-START
   NTN-SPECIFIC-CONFIG::=Sequence {
      txDirectCurrentLocation_NTN INTEGER (0 . . . 4095)
   }
--TAG-NTN-SPECIFICCONFIG-STOP
--ASNISTOP
```

After a system of the second communication apparatus is initialized, the location of the first direct current subcarrier basically remains unchanged, and the location of the second direct current subcarrier changes continuously with the Doppler frequency offset value, and needs to be continuously dynamically indicated. When the first information and the second information are sent by using different messages, after the first information is delivered, only the second information may be continuously dynamically delivered, and the first information is not repeatedly sent, so that signaling overheads can be reduced. Further, when the second information is sent by using the newly added RRC information element, because the newly added RRC information element can be used to transmit only information indicating the location of the second direct current subcarrier, signaling overheads can be further reduced.

In some embodiments, the second communication apparatus sends the first information and the second information to the first communication apparatus by using one message. For example, the second communication apparatus sends a third message to the first communication apparatus. The third message includes the first information and the second information.

For example, when the first information includes the first index value and the second information includes the second index value, a field (for example, txDirectCurrentLocation_NTN) may be added to the RRC message structure SCS-SpecificCarrier defined in the protocol 38.331, to transmit the second information. Details are as follows:

```
ASNISTART
--TAG-SCS-SPECIFICCARRIER-START
SCS-SpecificCarrier::=SEQUENCE {
   offsetToCarrier INTEGER (0 . . . 2199),
   subcarrierSpacing SubcarrierSpacing,
   carrierBandwidth INTEGER (1 . . . maxNrofPhysical-
      ResourceBlocks),
   . . . ,
   [[
   txDirectCurrentLocation INTEGER (0 . . . 4095)
   OPTIONAL --Need S
      txDirectCurrentLocation_NTN INTEGER (0 . . . 4095)
   OPTIONAL --Need S
   ]]
}
```

In another example, when the first information includes the third index value and the second information includes the subcarrier offset value of the second direct current subcarrier relative to the first direct current subcarrier, a field (for example, txDirectCurrentLocation_NTN_offset) may be added to the RRC message structure SCS-SpecificCarrier defined in the protocol 38.331, to transmit the second information. Details are as follows:

```
ASNISTART
--TAG-SCS-SPECIFICCARRIER-START
SCS-SpecificCarrier::=SEQUENCE {
   offsetToCarrier INTEGER (0 . . . 2199),
   subcarrierSpacing SubcarrierSpacing,
   carrierBandwidth INTEGER (1 . . . maxNrofPhysical-
      ResourceBlocks),
   . . . ,
   [[
   txDirectCurrentLocation INTEGER (0 . . . Y)
   OPTIONAL --Need S
      txDirectCurrentLocation_NTN_offset    INTEGER
         (-Z . . . Z)
   OPTIONAL --Need S
   ]]
}
```

In step 530, the first communication apparatus determines, based on the first information and the second information, a location of the first direct current subcarrier on a frequency domain resource of the first communication apparatus and a location of the second direct current subcarrier on the frequency domain resource of the first communication apparatus.

In some possible implementations, when the first information includes the first index value, and the second information includes the second index value, the first communication apparatus may determine the location of the first direct current subcarrier based on the first index value included in the first information, and determine the location of the second direct current subcarrier based on the second index value included in the second information.

In some possible implementations, when the first information includes the third index value, and the second information includes the subcarrier offset value of the second direct current subcarrier relative to the first direct current subcarrier, the first communication apparatus may determine the location of the first direct current subcarrier based on the third index value included in the first information. Further, the first communication apparatus may determine the location of the second direct current subcarrier based on the location of the first direct current subcarrier and the subcarrier offset value of the second direct current subcarrier relative to the first direct current subcarrier.

The method for indicating a direct current subcarrier provided in this application is described in detail above. The following describes a communication apparatus provided in this application.

It can be understood that, to implement functions in the foregoing embodiments, the communication apparatus includes corresponding hardware structures and/or software modules for performing the functions. Persons skilled in the art should be easily aware that, with reference with units and method steps in the examples described in embodiments disclosed in this application, this application can be implemented by hardware or a combination of hardware and computer software. Whether a function is performed by hardware or hardware driven by computer software depends on a particular application and a design constraint of the technical solutions.

Figure 6:
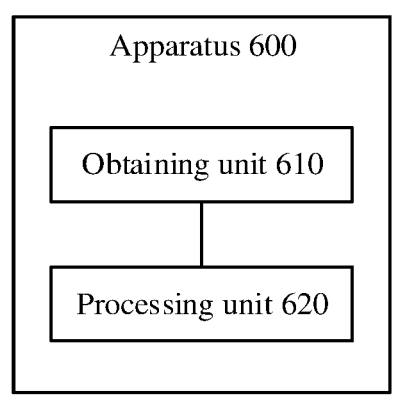
FIG. 6 is a schematic block diagram of a communication apparatus according to an embodiment of this application.

FIG. 6 is a schematic block diagram of a communication apparatus according to an embodiment of this application. The apparatus 600 has functional modules for implementing the method performed by the first communication apparatus in FIG. 4. Specifically, the apparatus 600 includes an obtaining unit 610 and a processing unit 620.

The obtaining unit 610 is configured to obtain first information and second information. The first information indicates a location of a first direct current subcarrier on a frequency domain resource, the first direct current subcarrier is a direct current subcarrier corresponding to a transmit frequency used by a second communication apparatus, the frequency domain resource includes frequency domain resources inside and outside a frequency band, and the frequency band is a carrier frequency band corresponding to a subcarrier spacing used by the first communication apparatus. The second information indicates a Doppler frequency offset value between the first communication apparatus and the second communication apparatus.

The processing unit 620 is configured to determine the location of the first direct current subcarrier on the frequency domain resource and a location of a second direct current subcarrier on the frequency domain resource based on the first information and the second information. The second direct current subcarrier is a direct current subcarrier corresponding to a receive frequency used by the first communication apparatus.

Optionally, with reference to the first aspect, in some possible implementations, the first information includes a first index value, and a quantity of subcarriers between the first direct current subcarrier and a start subcarrier of the frequency band is an absolute value of the first index value, where a value range of the first index value is [−X, Y], X is greater than Z and less than or equal to 4096, Y is greater than 3300+Z and less than or equal to 4095, and Z is greater than or equal to 0.

Optionally, the first information includes a second index value and indication information, and a quantity of subcarriers between the first direct current subcarrier and a start subcarrier of the frequency band is the second index value, where the indication information indicates an offset direction of the first direct current subcarrier relative to the start subcarrier, a value range of the second index value is [0, Y], Y is greater than 3300+Z and less than or equal to 4095, and Z is greater than or equal to 0.

Optionally, the indication information is indicated by using a first Boolean variable.

Optionally, Z is obtained by rounding up a normalized maximum Doppler frequency offset value between the first communication apparatus and the second communication apparatus.

Optionally, the obtaining unit 610 is specifically configured to obtain the first information and the second information from the second communication apparatus.

In the foregoing implementations, when the obtaining unit 610 obtains the second information from the second communication apparatus, the obtaining unit 610 may be implemented by a receiver. When the obtaining unit 610 obtains the second information from the first communication apparatus, the obtaining unit 610 may be implemented by a processor.

Optionally, the receiver may be separately disposed, or may be a part of a transceiver that has receiving and sending functions. This is not limited herein.

Optionally, in an example, the communication apparatus 600 may be the first communication apparatus in the method embodiments.

Optionally, in another example, the communication apparatus 600 may be a chip or an integrated circuit mounted in the first communication apparatus. In this case, the obtaining unit 610 may be a communication interface or an interface circuit. For example, the obtaining unit 610 is an input interface or an input circuit.

In various examples, the processing unit 620 is configured to perform processing and/or operations implemented internally by the first communication apparatus other than actions of sending and receiving.

Optionally, the processing unit 620 may be a processing apparatus. A function of the processing apparatus may be implemented by hardware, or may be implemented by hardware executing corresponding software. For example, the processing apparatus may include at least one processor and at least one memory. The at least one memory is configured to store a computer program, and the at least one processor reads and executes the computer program stored in the at least one memory, so that the communication apparatus 600 performs operations and/or processing performed by the first communication apparatus in various method embodiments.

Optionally, the processing apparatus may include only the processor, and the memory configured to store a computer program is located outside the processing apparatus. The processor is connected to the memory by using a circuit/wire, to read and execute the computer program stored in the memory.

In some examples, the processing apparatus may alternatively be a chip or an integrated circuit. For example, the processing apparatus includes a processing circuit/logic circuit and an interface circuit. The interface circuit is configured to obtain the first information and the second information in various method embodiments, and the processing circuit/logic circuit is configured to perform the determining processing performed by the first communication apparatus in various method embodiments, to obtain the location of the first direct current subcarrier on the frequency domain resource and the location of the second direct current subcarrier on the frequency domain resource.

For more detailed descriptions of the obtaining unit 610 and the processing unit 620, directly refer to related descriptions in the method embodiment shown in FIG. 4. Details are not described herein.

Figure 7:
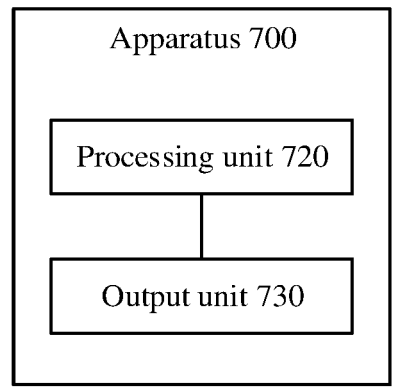
FIG. 7 is a schematic block diagram of a communication apparatus according to another embodiment of this application.

FIG. 7 is a schematic block diagram of a communication apparatus according to another embodiment of this application. The apparatus 700 has functional modules for implementing the method performed by the second communication apparatus in FIG. 4. Specifically, the apparatus 700 includes a processing unit 720 and an output unit 730.

The processing unit 720 is configured to determine first information. The first information indicates a location of a first direct current subcarrier on a frequency domain resource, the first direct current subcarrier is a direct current subcarrier corresponding to a transmit frequency used by the second communication apparatus, the frequency domain resource includes frequency domain resources inside and outside a frequency band, and the frequency band is a carrier frequency band corresponding to a subcarrier spacing used by the first communication apparatus.

The output unit 730 is configured to output the first information.

Optionally, the first information includes a first index value, and a quantity of subcarriers between the first direct current subcarrier and a start subcarrier of the frequency band is an absolute value of the first index value, where a value range of the first index value is [−X, Y], X is greater than Z and less than or equal to 4096, Y is greater than 3300+Z and less than or equal to 4095, and Z is greater than or equal to 0.

Optionally, the first information includes a second index value and indication information, and a quantity of subcarriers between the first direct current subcarrier and a start subcarrier of the frequency band is the second index value, where the indication information indicates an offset direction of the first direct current subcarrier relative to the start subcarrier, a value range of the second index value is [0, Y], Y is greater than 3300+Z and less than or equal to 4095, and Z is greater than or equal to 0.

Optionally, the indication information is indicated by using a first Boolean variable.

Optionally, Z is obtained by rounding up a normalized maximum Doppler frequency offset value between the first communication apparatus and the second communication apparatus.

Optionally, the processing unit 720 is further configured to determine second information, where the second information indicates a Doppler frequency offset value between the first communication apparatus and the second communication apparatus; and the output unit 730 is further configured to output the second information.

In the foregoing implementations, the output unit 730 may be implemented by a transmitter.

Optionally, the transmitter may be separately disposed, or may be a part of a transceiver that has receiving and sending functions. This is not limited herein.

Optionally, in an example, the communication apparatus 700 may be the second communication apparatus in the method embodiments.

Optionally, in another example, the communication apparatus 700 may be a chip or an integrated circuit mounted in the second communication apparatus. In this case, the output unit 730 may be a communication interface or an interface circuit. For example, the output unit 730 is an output interface or an output circuit.

In various examples, the processing unit 720 is configured to perform processing and/or operations implemented internally by the second communication apparatus other than actions of sending and receiving.

Optionally, the processing unit 720 may be a processing apparatus. A function of the processing apparatus may be implemented by hardware, or may be implemented by hardware executing corresponding software. For example, the processing apparatus may include at least one processor and at least one memory. The at least one memory is configured to store a computer program, and the at least one processor reads and executes the computer program stored in the at least one memory, so that the communication apparatus 700 performs operations and/or processing performed by the second communication apparatus in various method embodiments.

Optionally, the processing apparatus may include only the processor, and the memory configured to store a computer program is located outside the processing apparatus. The processor is connected to the memory by using a circuit/wire, to read and execute the computer program stored in the memory.

In some examples, the processing apparatus may alternatively be a chip or an integrated circuit. For example, the processing apparatus includes a processing circuit/logic circuit and an interface circuit. The processing circuit/logic circuit is configured to perform the determining processing performed by the second communication apparatus in various method embodiments, to obtain the first information and the second information in various method embodiments, and the interface circuit is configured to output the first information and the second information.

For more detailed descriptions of the processing unit 720 and the output unit 730, directly refer to related descriptions in the method embodiment shown in FIG. 4. Details are not described herein.

Figure 8:
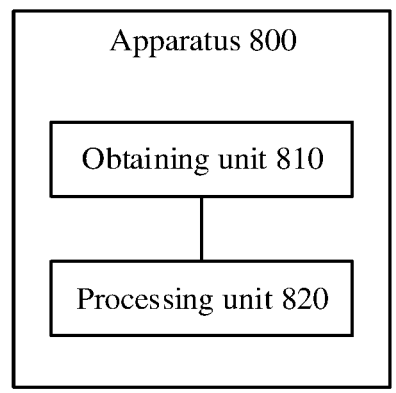
FIG. 8 is a schematic block diagram of a communication apparatus according to another embodiment of this application.

FIG. 8 is a schematic block diagram of a communication apparatus according to another embodiment of this application. The apparatus 800 has functional modules for implementing the method performed by the first communication apparatus in FIG. 5. Specifically, the apparatus 800 includes an obtaining unit 810 and a processing unit 820.

The obtaining unit 810 is configured to obtain first information and second information, where the first information indicates a location of a first direct current subcarrier inside a frequency band or indicates that the first direct current subcarrier is outside the frequency band, the second information indicates a location of a second direct current subcarrier inside the frequency band or indicates that the second direct current subcarrier is outside the frequency band, the first direct current subcarrier is a direct current subcarrier corresponding to a transmit frequency used by a second communication apparatus, the second direct current subcarrier is a direct current subcarrier corresponding to a receive frequency used by the first communication apparatus, and the frequency band is a carrier frequency band corresponding to a subcarrier spacing used by the first communication apparatus.

The processing unit 820 is configured to determine the location of the first direct current subcarrier on the frequency band and a location of the second direct current subcarrier on the frequency band based on the first information and the second information.

Optionally, the first information includes a first index value. When a value of the first index value is within [0, 3299], a quantity of subcarriers between the first direct current subcarrier and a start subcarrier of the frequency band is the first index value; or when the value of the first index value is 3300, the first direct current subcarrier is outside the frequency band. The second information includes a second index value. When a value of the second index value is within [0, 3299], a quantity of subcarriers between the second direct current subcarrier and the start subcarrier of the frequency band is the second index value; or when the value of the second index value is 3300, the second direct current subcarrier is outside the frequency band.

Optionally, the first information includes a third index value, and a quantity of subcarriers between the first direct current subcarrier and a start subcarrier of the frequency band is the third index value, where a value range of the third index value is [0, Y], Y is greater than or equal to 3300+Z and less than or equal to 4095, and Z is greater than or equal to 0. The second information includes a subcarrier offset value of the second direct current subcarrier relative to the first direct current subcarrier.

Optionally, Z is obtained by rounding up a normalized maximum Doppler frequency offset value between the first communication apparatus and the second communication apparatus.

Optionally, the obtaining unit 810 is specifically configured to receive a first message from the second communication apparatus, where the first message includes the first information and the second information.

Optionally, the obtaining unit 810 is specifically configured to receive a first message and a second message from the second communication apparatus, where the first message includes the first information, and the second message includes the second information.

In the foregoing implementations, the obtaining unit 810 may be implemented by a receiver.

Optionally, the receiver may be separately disposed, or may be a part of a transceiver that has receiving and sending functions. This is not limited herein.

Optionally, in an example, the communication apparatus 800 may be the first communication apparatus in the method embodiments.

Optionally, in another example, the communication apparatus 800 may be a chip or an integrated circuit mounted in the first communication apparatus. In this case, the obtaining unit 810 may be a communication interface or an interface circuit. For example, the obtaining unit 810 is an input interface or an input circuit.

In various examples, the processing unit 820 is configured to perform processing and/or operations implemented internally by the first communication apparatus other than actions of sending and receiving.

Optionally, the processing unit 820 may be a processing apparatus. A function of the processing apparatus may be implemented by hardware, or may be implemented by hardware executing corresponding software. For example, the processing apparatus may include at least one processor and at least one memory. The at least one memory is configured to store a computer program, and the at least one processor reads and executes the computer program stored in the at least one memory, so that the communication apparatus 800 performs operations and/or processing performed by the first communication apparatus in various method embodiments.

Optionally, the processing apparatus may include only the processor, and the memory configured to store a computer program is located outside the processing apparatus. The processor is connected to the memory by using a circuit/wire, to read and execute the computer program stored in the memory.

In some examples, the processing apparatus may alternatively be a chip or an integrated circuit. For example, the processing apparatus includes a processing circuit/logic circuit and an interface circuit. The interface circuit is configured to obtain the first information and the second information in various method embodiments, and the processing circuit/logic circuit is configured to perform the determining processing performed by the first communication apparatus in various method embodiments, to obtain the location of the first direct current subcarrier on the frequency domain resource and the location of the second direct current subcarrier on the frequency domain resource.

For more detailed descriptions of the obtaining unit 810 and the processing unit 820, directly refer to related descriptions in the method embodiment shown in FIG. 5. Details are not described herein.

Figure 9:
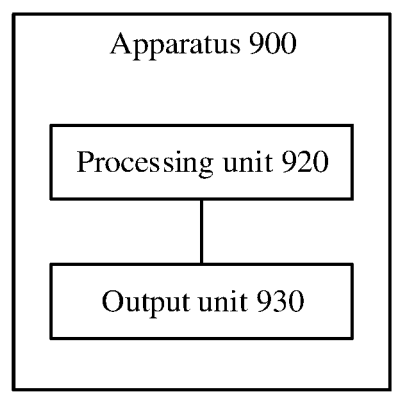
FIG. 9 is a schematic block diagram of a communication apparatus according to another embodiment of this application.

FIG. 9 is a schematic block diagram of a communication apparatus according to another embodiment of this application. The apparatus 900 has functional modules for implementing the method performed by the second communication apparatus in FIG. 5. Specifically, the apparatus 900 includes a processing unit 920 and an output unit 930.

The processing unit 920 is configured to determine first information and second information, where the first information indicates a location of a first direct current subcarrier inside a frequency band or indicates that the first direct current subcarrier is outside the frequency band, the second information indicates a location of a second direct current subcarrier inside the frequency band or indicates that the second direct current subcarrier is outside the frequency band, the first direct current subcarrier is a direct current subcarrier corresponding to a transmit frequency used by a second communication apparatus, the second direct current subcarrier is a direct current subcarrier corresponding to a receive frequency used by the first communication apparatus, and the frequency band is a carrier frequency band corresponding to a subcarrier spacing used by the first communication apparatus.

The output unit 930 is configured to output the first information and the second information.

Optionally, the first information includes a first index value. When a value of the first index value is within [0, 3299], a quantity of subcarriers between the first direct current subcarrier and a start subcarrier of the frequency band is the first index value; or when the value of the first index value is 3300, the first direct current subcarrier is outside the frequency band. The second information includes a second index value. When a value of the second index value is within [0, 3299], a quantity of subcarriers between the second direct current subcarrier and the start subcarrier of the frequency band is the second index value; or when the value of the second index value is 3300, the second direct current subcarrier is outside the frequency band.

Optionally, the first information includes a third index value, and a quantity of subcarriers between the first direct current subcarrier and a start subcarrier of the frequency band is the third index value, where a value range of the third index value is [0, Y], Y is greater than or equal to 3300+Z and less than or equal to 4095, and Z is greater than or equal to 0. The second information includes a subcarrier offset value of the second direct current subcarrier relative to the first direct current subcarrier.

Optionally, Z is obtained by rounding up a normalized maximum Doppler frequency offset value between the first communication apparatus and the second communication apparatus.

Optionally, the output unit 930 is specifically configured to send a first message to the first communication apparatus, where the first message includes the first information and the second information.

Optionally, the output unit 930 is specifically configured to send a first message and a second message to the first communication apparatus, where the first message includes the first information, and the second message includes the second information.

In the foregoing implementations, the output unit 930 may be implemented by a transmitter.

Optionally, the transmitter may be separately disposed, or may be a part of a transceiver that has receiving and sending functions. This is not limited herein.

Optionally, in an example, the communication apparatus 900 may be the second communication apparatus in the method embodiments.

Optionally, in another example, the communication apparatus 900 may be a chip or an integrated circuit mounted in the second communication apparatus. In this case, the output unit 930 may be a communication interface or an interface circuit. For example, the output unit 930 is an output interface or an output circuit.

In various examples, the processing unit 920 is configured to perform processing and/or operations implemented internally by the second communication apparatus other than actions of sending and receiving.

Optionally, the processing unit 920 may be a processing apparatus. A function of the processing apparatus may be implemented by hardware, or may be implemented by hardware executing corresponding software. For example, the processing apparatus may include at least one processor and at least one memory. The at least one memory is configured to store a computer program, and the at least one processor reads and executes the computer program stored in the at least one memory, so that the communication apparatus 900 performs operations and/or processing performed by the second communication apparatus in various method embodiments.

Optionally, the processing apparatus may include only the processor, and the memory configured to store a computer program is located outside the processing apparatus. The processor is connected to the memory by using a circuit/wire, to read and execute the computer program stored in the memory.

In some examples, the processing apparatus may alternatively be a chip or an integrated circuit. For example, the processing apparatus includes a processing circuit/logic circuit and an interface circuit. The processing circuit/logic circuit is configured to perform the determining processing performed by the second communication apparatus in various method embodiments, to obtain the first information and the second information in various method embodiments, and the interface circuit is configured to output the first information and the second information.

For more detailed descriptions of the processing unit 920 and the output unit 930, directly refer to related descriptions in the method embodiment shown in FIG. 5. Details are not described herein.

Figure 10:
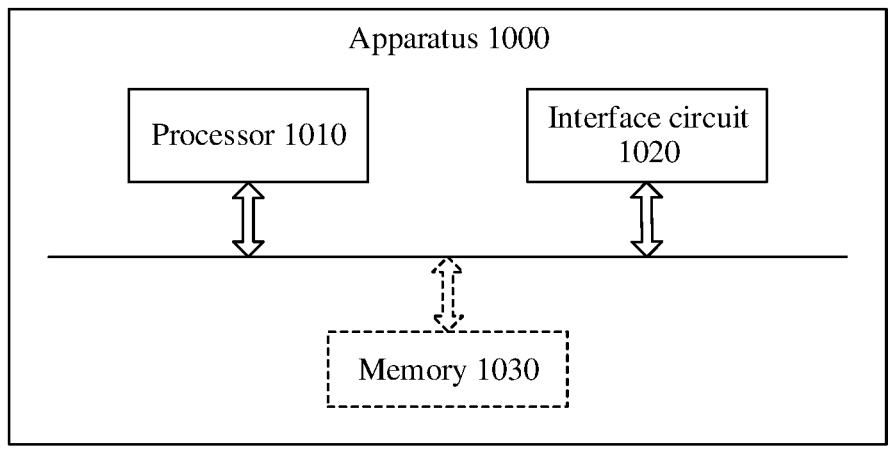
FIG. 10 is a schematic block diagram of a communication apparatus according to another embodiment of this application.

FIG. 10 is a schematic diagram of a structure of a communication apparatus according to another embodiment of this application. As shown in FIG. 10, the apparatus 1000 includes one or more processors 1010 and one or more interface circuits 1020. The processor 1010 and the interface circuit 1020 are coupled to each other. It can be understood that the interface circuit 1020 may be a transceiver or an input/output interface. Optionally, the apparatus 1000 may further include one or more memories 1030, configured to: store instructions executed by the processor 1010, or store input data required by the processor 1010 to run the instructions, or store data generated after the processor 1010 runs the instructions.

When the apparatus 1000 is configured to implement the method shown in FIG. 4, the processor 1010 is configured to perform a function of the processing unit 620, and the interface circuit 1020 is configured to perform a function of the obtaining unit 610.

In an implementation, the apparatus 1000 may be the first communication apparatus in the method embodiments.

Figure 11:
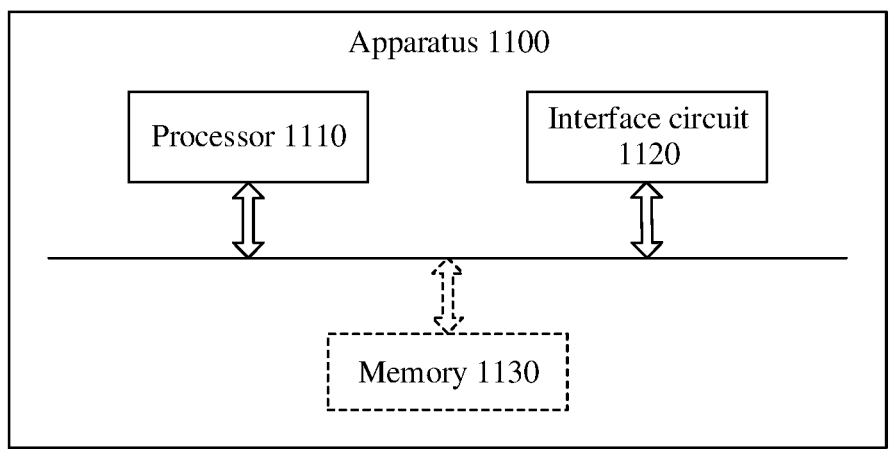
FIG. 11 is a schematic block diagram of a communication apparatus according to another embodiment of this application.

FIG. 11 is a schematic diagram of a structure of a communication apparatus according to another embodiment of this application. As shown in FIG. 11, the apparatus 1100 includes one or more processors 1110 and one or more interface circuits 1120. The processor 1110 and the interface circuit 1120 are coupled to each other. It can be understood that the interface circuit 1120 may be a transceiver or an input/output interface. Optionally, the apparatus 1100 may further include one or more memories 1130, configured to: store instructions executed by the processor 1110, or store input data required by the processor 1110 to run the instructions, or store data generated after the processor 1110 runs the instructions.

When the apparatus 1100 is configured to implement the method shown in FIG. 4, the processor 1110 is configured to perform a function of the processing unit 720, and the interface circuit 1120 is configured to perform a function of the output unit 730.

In an implementation, the apparatus 1100 may be the second communication apparatus in the method embodiments.

Figure 12:
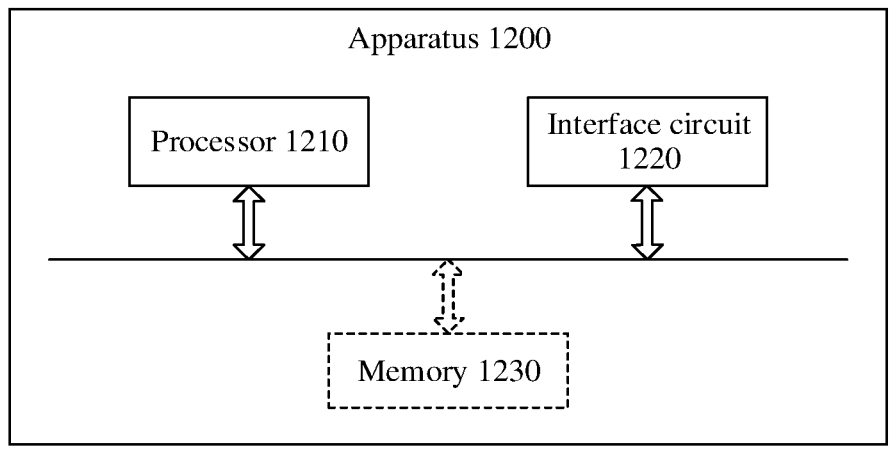
FIG. 12 is a schematic block diagram of a communication apparatus according to another embodiment of this application.

FIG. 12 is a schematic diagram of a structure of a communication apparatus according to another embodiment of this application. As shown in FIG. 12, the apparatus 1200 includes one or more processors 1210 and one or more interface circuits 1220. The processor 1210 and the interface circuit 1220 are coupled to each other. It can be understood that the interface circuit 1220 may be a transceiver or an input/output interface. Optionally, the apparatus 1200 may further include one or more memories 1230, configured to: store instructions executed by the processor 1210, or store input data required by the processor 1210 to run the instructions, or store data generated after the processor 1210 runs the instructions.

When the apparatus 1200 is configured to implement the method shown in FIG. 5, the processor 1210 is configured to perform a function of the processing unit 820, and the interface circuit 1220 is configured to perform a function of the obtaining unit 810.

In an implementation, the apparatus 1200 may be the first communication apparatus in the method embodiments.

Figure 13:
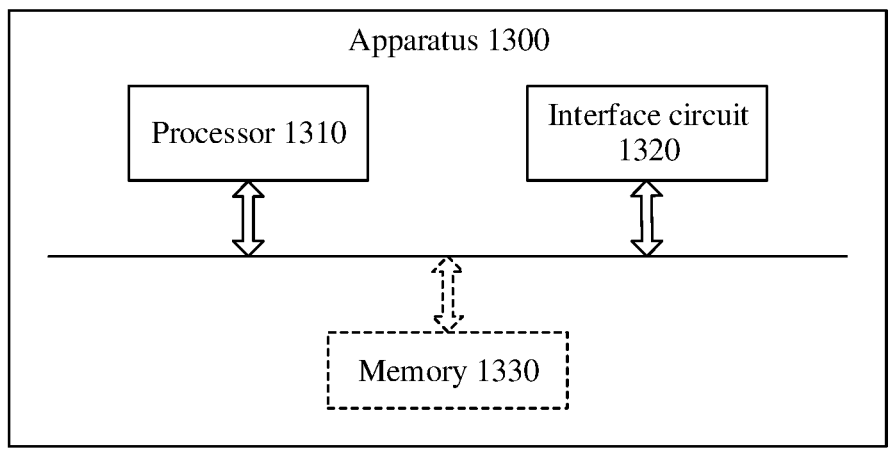
FIG. 13 is a schematic block diagram of a communication apparatus according to another embodiment of this application.

FIG. 13 is a schematic diagram of a structure of a communication apparatus according to another embodiment of this application. As shown in FIG. 13, the apparatus 1300 includes one or more processors 1310 and one or more interface circuits 1320. The processor 1310 and the interface circuit 1320 are coupled to each other. It can be understood that the interface circuit 1320 may be a transceiver or an input/output interface. Optionally, the apparatus 1300 may further include one or more memories 1330, configured to: store instructions executed by the processor 1310, or store input data required by the processor 1310 to run the instructions, or store data generated after the processor 1310 runs the instructions.

When the apparatus 1300 is configured to implement the method shown in FIG. 4, the processor 1310 is configured to perform a function of the processing unit 920, and the interface circuit 1320 is configured to perform a function of the output unit 930.

In an implementation, the apparatus 1300 may be the second communication apparatus in the method embodiments.

Optionally, the memory and the processor in the foregoing apparatus embodiments may be physically independent units, or the memory and the processor may be integrated together. This is not limited herein.

In addition, this application further provides a computer-readable storage medium. The computer-readable storage medium stores computer instructions. When the computer instructions are run on a computer, an operation and/or a procedure performed by the first communication apparatus in the method embodiments of this application are performed.

This application further provides a computer-readable storage medium. The computer-readable storage medium stores computer instructions. When the computer instructions are run on a computer, an operation and/or a procedure performed by the second communication apparatus in the method embodiments of this application are performed.

In addition, this application further provides a computer program product. The computer program product includes computer program code or instructions. When the computer program code or instructions are run on a computer, an operation and/or a procedure performed by the first communication apparatus in the method embodiments of this application are performed.

This application further provides a computer program product. The computer program product includes computer program code or instructions. When the computer program code or instructions are run on a computer, an operation and/or a procedure performed by the second communication apparatus in the method embodiments of this application are performed.

In addition, this application further provides a chip. The chip includes a processor. A memory configured to store a computer program is disposed independently of the chip. The processor is configured to execute the computer program stored in the memory, so that the first communication apparatus on which the chip is mounted performs an operation and/or processing performed by the first communication apparatus in any one method embodiment.

Further, the chip may further include a communication interface. The communication interface may be an input/output interface, or may be an interface circuit, or the like. Further, the chip may further include the memory.

This application further provides a chip. The chip includes a processor. A memory configured to store a computer program is disposed independently of the chip. The processor is configured to execute the computer program stored in the memory, so that the second communication apparatus on which the chip is mounted performs an operation and/or processing performed by the second communication apparatus in any one method embodiment.

Further, the chip may further include a communication interface. The communication interface may be an input/output interface, or may be an interface circuit, or the like. Further, the chip may further include the memory.

In addition, this application further provides a communication apparatus (for example, may be a chip), including a processor and a communication interface. The communication interface is configured to: receive a signal and transmit the signal to the processor, and the processor processes the signal, so that an operation and/or processing performed by the first communication apparatus in any one method embodiment are performed.

This application further provides a communication apparatus (for example, may be a chip), including a processor and a communication interface. The communication interface is configured to: receive a signal and transmit the signal to the processor, and the processor processes the signal, so that an operation and/or processing performed by the second communication apparatus in any one method embodiment are performed.

In addition, this application further provides a communication apparatus, including at least one processor. The at least one processor is coupled to at least one memory, and the at least one processor is configured to execute a computer program or instructions stored in the at least one memory, so that an operation and/or processing performed by the first communication apparatus in any one method embodiment are performed.

This application further provides a communication apparatus, including at least one processor. The at least one processor is coupled to at least one memory, and the at least one processor is configured to execute a computer program or instructions stored in the at least one memory, so that an operation and/or processing performed by the second communication apparatus in any one method embodiment are performed.

In addition, this application further provides a communication apparatus, including a processor, a memory, and a transceiver. The memory is configured to store a computer program, and the processor is configured to: invoke and run the computer program stored in the memory, and control the transceiver to receive and send signals, so that the first communication apparatus performs an operation and/or processing performed by the first communication apparatus in any one method embodiment.

This application further provides a communication apparatus, including a processor, a memory, and a transceiver. The memory is configured to store a computer program, and the processor is configured to: invoke and run the computer program stored in the memory, and control the transceiver to receive and send signals, so that the second communication apparatus performs an operation and/or processing performed by the second communication apparatus in any one method embodiment.

In addition, this application further provides a wireless communication system, including a first communication apparatus and a second communication apparatus in embodiments of this application.

A processor in this embodiment of this application may be an integrated circuit chip, and has a signal processing capability. In an implementation process, steps in the foregoing method embodiments are implemented by using a hardware integrated logic circuit in the processor, or by using instructions in a form of software. The processor may be a general-purpose processor, a digital signal processor (DSP), an application-specific integrated circuit (ASIC), a field programmable gate array (FPGA) or another programmable logic device, a discrete gate or transistor logic device, or a discrete hardware component. The general-purpose processor may be a microprocessor, or the processor may be any conventional processor or the like. The steps of the methods disclosed in embodiments of this application may be directly presented as being performed and completed by a hardware encoding processor, or performed and completed by a combination of hardware and a software module in an encoding processor. The software module may be located in a mature storage medium in the art, such as a random access memory, a flash memory, a read-only memory, a programmable read-only memory, an electrically erasable programmable memory, or a register. The storage medium is located in the memory, and the processor reads information in the memory and completes the steps in the foregoing methods in combination with hardware of the processor.

It can be understood that the memory in embodiments of this application may be a volatile memory or a non-volatile memory, or may include a volatile memory and a non-volatile memory. The non-volatile memory may be a read-only memory (ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (RAM) used as an external cache. By way of example but not limitation, many forms of RAMs are usable, such as a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchlink dynamic random access memory (synchlink DRAM, SLDRAM), and a direct rambus random access memory (direct rambus RAM, DRRAM). It should be noted that the memory of the systems and methods described in this specification includes but is not limited to these and any memory of another proper type.

Persons of ordinary skill in the art may be aware that, in combination with the examples described in embodiments disclosed in this specification, units and algorithm steps may be implemented by electronic hardware or a combination of computer software and electronic hardware. Whether the functions are performed by hardware or software depends on particular applications and design constraint conditions of the technical solutions. Persons skilled in the art may use different methods to implement the described functions for each particular application, but it should not be considered that the implementation goes beyond the scope of this application.

It may be clearly understood by persons skilled in the art that, for the purpose of convenient and brief description, for a detailed working process of the foregoing system, apparatus, and unit, refer to a corresponding process in the foregoing method embodiments. Details are not described herein again.

In several embodiments provided in this application, it should be understood that the disclosed system, apparatus, and method may be implemented in another manner. For example, the described apparatus embodiment is merely an example. For example, division into the units is merely logical function division and may be other division in an actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or another form.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of embodiments.

In addition, functional units in embodiments of this application may be integrated into one processing unit, each of the units may exist alone physically, or two or more units may be integrated into one unit.

The term "and/or" in this specification describes only an association relationship for describing associated objects and represents that three relationships may exist. For example, A and/or B may represent the following three cases: Only A exists, both A and B exist, and only B exists. A, B, and C may all be singular or plural. This is not limited.

In embodiments of this application, numbers "first" and "second" are used to distinguish between same items or similar items having basically same functions and functions. Persons skilled in the art can understand that "first" and "second" do not limit a quantity or a sequence, and "first", "second", and the like do not limit a necessary difference.

When the functions are implemented in the form of a software functional unit and sold or used as an independent product, the functions may be stored in a computer-readable storage medium. Based on such understanding, the technical solutions of this application essentially, or the part contributing to the conventional technology, or some of the technical solutions may be implemented in a form of a software product. The computer software product is stored in a storage medium, and includes several instructions for instructing a computer device (which may be a personal computer, a server, or a network device) to perform all or some of the steps of the methods described in embodiments of this application.

The foregoing descriptions are merely specific implementations of this application, but are not intended to limit the protection scope of this application. Any variation or replacement readily figured out by persons skilled in the art within the technical scope disclosed in this application shall fall within the protection scope of this application. Therefore, the protection scope of this application shall be subject to the protection scope of the claims.

What is claimed is:

1. A method for indicating a direct current subcarrier, comprising:
    obtaining, by a first communication apparatus, first information and second information, wherein:
        the first information indicates a location of a first direct current subcarrier on a frequency domain resource,
        the first direct current subcarrier is a direct current subcarrier corresponding to a transmit frequency used by a second communication apparatus,
        the frequency domain resource comprises frequency domain resources inside and outside a frequency band,
        the frequency band is a carrier frequency band corresponding to a subcarrier spacing used by the first communication apparatus, and
        the second information indicates a Doppler frequency offset value between the first communication apparatus and the second communication apparatus; and
    determining, by the first communication apparatus, the location of the first direct current subcarrier on the frequency domain resource and a location of a second direct current subcarrier on the frequency domain resource based on the first information and the second information, wherein the second direct current subcarrier is a direct current subcarrier corresponding to a receive frequency used by the first communication apparatus.

2. The method according to claim 1, wherein the first information comprises a first index value, wherein a quantity of subcarriers between the first direct current subcarrier and a start subcarrier of the frequency band is an absolute value of the first index value, and wherein a value range of the first index value is [−X, Y], X is greater than Z and less than or equal to 4096, Y is greater than 3300+Z and less than or equal to 4095, and Z is greater than or equal to 0.

3. The method according to claim 2, wherein Z is obtained by rounding up a normalized maximum Doppler frequency offset value between the first communication apparatus and the second communication apparatus.

4. The method according to claim 1, wherein the first information comprises a second index value and indication information, wherein a quantity of subcarriers between the first direct current subcarrier and a start subcarrier of the frequency band is the second index value, and wherein the indication information indicates an offset direction of the first direct current subcarrier relative to the start subcarrier, a value range of the second index value is [0, Y], Y is greater than 3300+Z and less than or equal to 4095, and Z is greater than or equal to 0.

5. The method according to claim 4, wherein the indication information is indicated by using a first Boolean variable.

6. The method according to claim 4, wherein Z is obtained by rounding up a normalized maximum Doppler frequency offset value between the first communication apparatus and the second communication apparatus.

7. A method for indicating a direct current subcarrier, comprising:
determining, by a second communication apparatus, first information, wherein:
the first information indicates a location of a first direct current subcarrier on a frequency domain resource,
the first direct current subcarrier is a direct current subcarrier corresponding to a transmit frequency used by the second communication apparatus,
the frequency domain resource comprises frequency domain resources inside and outside a frequency band, and
the frequency band is a carrier frequency band corresponding to a subcarrier spacing used by a first communication apparatus; and
outputting, by the second communication apparatus, the first information.

8. The method according to claim 7, wherein the first information comprises a first index value, wherein a quantity of subcarriers between the first direct current subcarrier and a start subcarrier of the frequency band is an absolute value of the first index value, and wherein a value range of the first index value is [−X, Y], X is greater than Z and less than or equal to 4096, Y is greater than 3300+Z and less than or equal to 4095, and Z is greater than or equal to 0.

9. The method according to claim 8, wherein Z is obtained by rounding up a normalized maximum Doppler frequency offset value between the first communication apparatus and the second communication apparatus.

10. The method according to claim 7, wherein the first information comprises a second index value and indication information, wherein a quantity of subcarriers between the first direct current subcarrier and a start subcarrier of the frequency band is the second index value, and wherein the indication information indicates an offset direction of the first direct current subcarrier relative to the start subcarrier, a value range of the second index value is [0, Y], Y is greater than 3300+Z and less than or equal to 4095, and Z is greater than or equal to 0.

11. The method according to claim 10, wherein the indication information is indicated by using a first Boolean variable.

12. The method according to claim 10, wherein Z is obtained by rounding up a normalized maximum Doppler frequency offset value between the first communication apparatus and the second communication apparatus.

13. A method for indicating a direct current subcarrier, comprising:
obtaining, by a first communication apparatus, first information and second information, wherein:
the first information indicates a location of a first direct current subcarrier inside a frequency band or indicates that the first direct current subcarrier is outside the frequency band,
the second information indicates a location of a second direct current subcarrier inside the frequency band or indicates that the second direct current subcarrier is outside the frequency band,
the first direct current subcarrier is a direct current subcarrier corresponding to a transmit frequency used by a second communication apparatus,
the second direct current subcarrier is a direct current subcarrier corresponding to a receive frequency used by the first communication apparatus, and
the frequency band is a carrier frequency band corresponding to a subcarrier spacing used by the first communication apparatus; and
determining, by the first communication apparatus, the location of the first direct current subcarrier on the frequency band and the location of the second direct current subcarrier on the frequency band based on the first information and the second information.

14. The method according to claim 13, wherein:
the first information comprises a first index value; and when a value of the first index value is within [0, 3299], a quantity of subcarriers between the first direct current subcarrier and a start subcarrier of the frequency band is the first index value; or when the value of the first index value is 3300, the first direct current subcarrier is outside the frequency band; and
the second information comprises a second index value; and when a value of the second index value is within [0, 3299], a quantity of subcarriers between the second direct current subcarrier and the start subcarrier of the frequency band is the second index value; or when the value of the second index value is 3300, the second direct current subcarrier is outside the frequency band.

15. The method according to claim 13, wherein:
the first information comprises a third index value, and a quantity of subcarriers between the first direct current subcarrier and a start subcarrier of the frequency band is the third index value, wherein a value range of the third index value is [0, Y], Y is greater than or equal to 3300+Z and less than or equal to 4095, and Z is greater than or equal to 0; and
the second information comprises a subcarrier offset value of the second direct current subcarrier relative to the first direct current subcarrier.

16. The method according to claim 13, wherein the obtaining, by the first communication apparatus, first information and second information comprises:
receiving, by the first communication apparatus, a first message and a second message from the second communication apparatus, wherein the first message comprises the first information, and the second message comprises the second information.

* * * * *